US011507957B2

(12) United States Patent
Adjaoute

(10) Patent No.: US 11,507,957 B2
(45) Date of Patent: *Nov. 22, 2022

(54) SMART RETAIL ANALYTICS AND COMMERCIAL MESSAGING

(71) Applicant: Brighterion, Inc., Purchase, NY (US)

(72) Inventor: Akli Adjaoute, Mill Valley, CA (US)

(73) Assignee: Brighterion, Inc., Purchase, NY (US)

( * ) Notice: Subject to any disclaimer, the term of this patent is extended or adjusted under 35 U.S.C. 154(b) by 166 days.

This patent is subject to a terminal disclaimer.

(21) Appl. No.: 17/117,918

(22) Filed: Dec. 10, 2020

(65) Prior Publication Data

US 2021/0097546 A1 Apr. 1, 2021

Related U.S. Application Data

(63) Continuation of application No. 14/522,463, filed on Oct. 23, 2014, now Pat. No. 10,896,421, which is a continuation-in-part of application No. 14/243,097, filed on Apr. 2, 2014, now abandoned.

(51) Int. Cl.
*G06Q 30/00* (2012.01)
*G06Q 20/40* (2012.01)
*G06Q 30/02* (2012.01)

(52) U.S. Cl.
CPC ..... *G06Q 20/4016* (2013.01); *G06Q 30/0201* (2013.01)

(58) Field of Classification Search
None
See application file for complete search history.

(56) References Cited

U.S. PATENT DOCUMENTS

| | | | |
|---|---|---|---|
| 7,159,208 | B2 | 1/2007 | Keeley |
| 7,403,922 | B1 | 7/2008 | Lewis et al. |
| 7,590,970 | B2 | 9/2009 | Bromley |
| 7,630,956 | B2 | 12/2009 | Wyatt et al. |
| 7,685,083 | B2 | 3/2010 | Fairweather |

(Continued)

OTHER PUBLICATIONS

Office Action from U.S. Appl. No. 16/424,187 (dated Feb. 26, 2021).

(Continued)

*Primary Examiner* — Naresh Vig
(74) *Attorney, Agent, or Firm* — Hovey Williams LLP

(57) ABSTRACT

A real-time fraud prevention system enables merchants and commercial organizations on-line to assess and protect themselves from high-risk users. A centralized database is configured to build and store dossiers of user devices and behaviors collected from subscriber websites in real-time. Real, low-risk users have webpage click navigation behaviors that are assumed to be very different than those of fraudsters. Individual user devices are distinguished from others by hundreds of points of user-device configuration data each independently maintains. A client agent provokes user devices to volunteer configuration data when a user visits respective webpages at independent websites. A collection of comprehensive dossiers of user devices is organized by their identifying information, and used calculating a fraud score in real-time. Each corresponding website is thereby assisted in deciding whether to allow a proposed transaction to be concluded with the particular user and their device.

20 Claims, 17 Drawing Sheets

(56) References Cited

U.S. PATENT DOCUMENTS

| | | | |
|---|---|---|---|
| 7,877,421 | B2 | 1/2011 | Berger et al. |
| 8,401,990 | B2 | 3/2013 | Silsby |
| 9,069,737 | B1 | 6/2015 | Kimotho et al. |
| 9,898,741 | B2 | 2/2018 | Siegel et al. |
| 9,996,694 | B2 | 6/2018 | Sethumadhavan et al. |
| 10,339,606 | B2 | 7/2019 | Gupta et al. |
| 10,817,530 | B2 | 10/2020 | Siebel et al. |
| 2002/0147754 | A1 | 10/2002 | Dempsey et al. |
| 2006/0171509 | A1 | 8/2006 | Berthaud et al. |
| 2007/0239936 | A1 | 10/2007 | Gluhovsky |
| 2010/0305993 | A1 | 12/2010 | Fisher |
| 2011/0196791 | A1* | 8/2011 | Dominguez ........... G06Q 40/00 705/44 |
| 2013/0018796 | A1 | 1/2013 | Kolhatkar et al. |
| 2014/0108251 | A1* | 4/2014 | Anderson .......... G06Q 20/4016 705/44 |
| 2015/0193263 | A1 | 7/2015 | Nayyar et al. |
| 2017/0006135 | A1 | 1/2017 | Siebel et al. |
| 2017/0289176 | A1 | 10/2017 | Chen et al. |
| 2018/0032723 | A1 | 2/2018 | Danger et al. |
| 2019/0007517 | A1 | 1/2019 | Jagannath et al. |

OTHER PUBLICATIONS

Office Action from U.S. Appl. No. 16/226,246 (dated Dec. 15, 2020).

Ex Parte Quayle Action from U.S. Appl. No. 16/369,626 (dated Jan. 7, 2021).

Office Action From U.S. Appl. No. 16/264,144 (dated Oct. 16, 2020).

Office Action From U.S. Appl. No. 16/168,566 (dated Dec. 18, 2020).

Office Action From U.S. Appl. No. 15/866,563 (dated Nov. 27, 2020).

Office Action from U.S. Appl. No. 16/168,566 (dated Mar. 23, 2021).

Office Action from U.S. Appl. No. 16/226,246 (dated Apr. 26, 2021).

Office Action from U.S. Appl. No. 16/264,144 (dated Apr. 23, 2021).

Office Action from U.S. Appl. No. 16/663,452 (dated Mar. 12, 2021).

Office Action from U.S. Appl. No. 16/743,009 (dated Mar. 24, 2021).

Office Action From U.S. Appl. No. 16/424,187 (dated Dec. 9, 2021).

Office Action From U.S. Appl. No. 16/743,009 (dated Jan. 28, 2022).

Office Action from U.S. Appl. No. 16/168,566 (dated Jul. 21, 2021).

Office Action from U.S. Appl. No. 16/264,144 (dated Sep. 22, 2021).

Office Action from U.S. Appl. No. 16/424,187 (dated Sep. 1, 2021).

Office Action from U.S. Appl. No. 16/663,452 (dated Aug. 17, 2021).

Office Action from U.S. Appl. No. 16/743,009 (dated Sep. 10, 2021).

Office Action From U.S. Appl. No. 16/168,566 (dated Sep. 9, 2020).

Office Action From U.S. Appl. No. 16/226,246 (dated Aug. 4, 2020).

Office Action From U.S. Appl. No. 16/184,894 (dated Sep. 21, 2020).

Office Action From U.S. Appl. No. 16/592,249 (dated Sep. 14, 2020).

Office Action From U.S. Appl. No. 16/601,226 (dated Sep. 2, 2020).

Office Action From U.S. Appl. No. 16/674,980 (dated Sep. 3, 2020).

Office Action From U.S. Appl. No. 16/855,131 (dated Sep. 24, 2020).

Office Action From U.S. Appl. No. 16/679,819 (dated Sep. 25, 2020).

Office Action From U.S. Appl. No. 16/677,458 (dated Sep. 24, 2020).

Office Action From U.S. Appl. No. 16/424,187 (dated Apr. 26, 2022).

Office Action From U.S. Appl. No. 16/264,144 (dated Apr. 13, 2022).

* cited by examiner

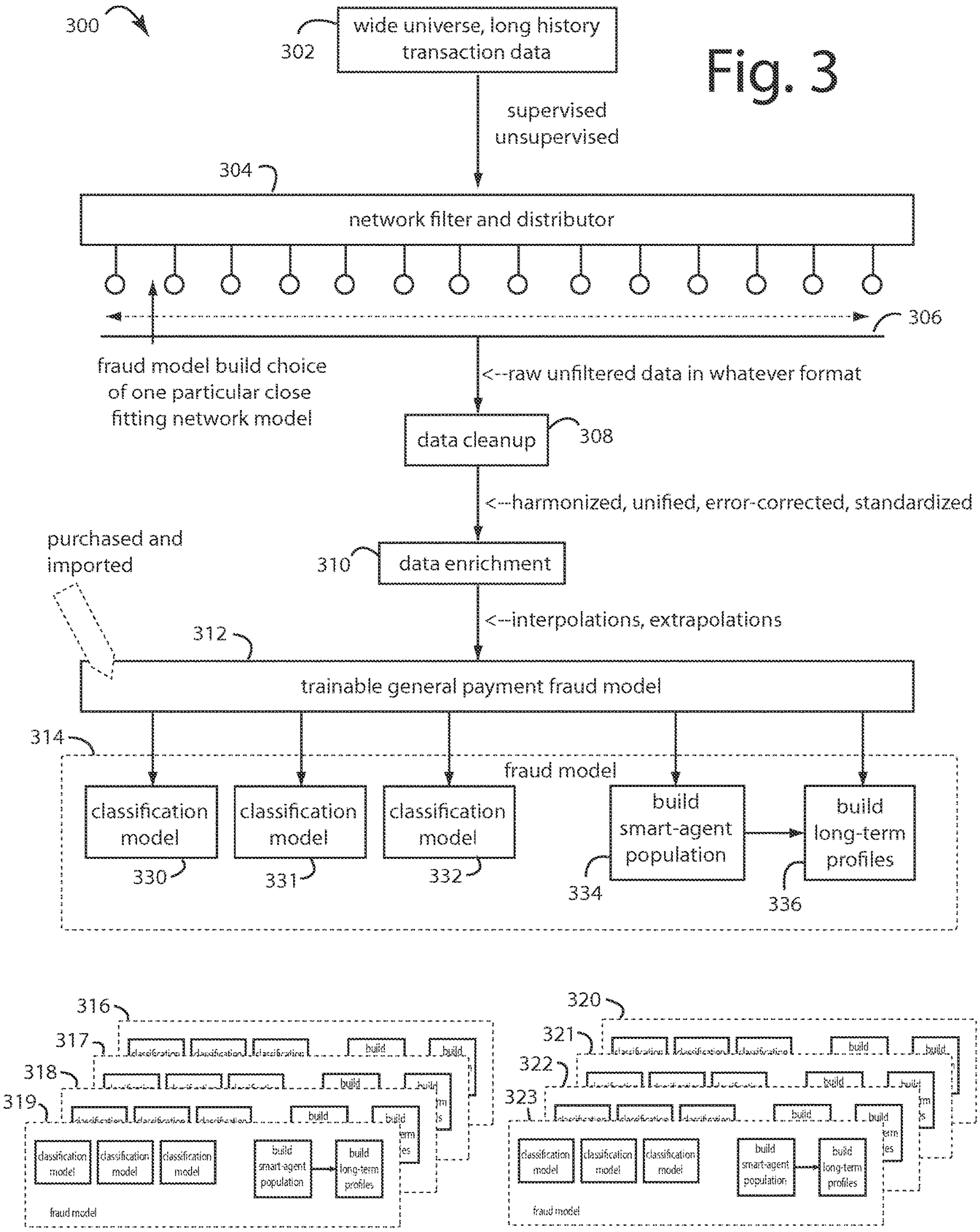
300
302
wide universe, long history transaction data
Fig. 3
supervised
unsupervised
304
network filter and distributor
306
fraud model build choice of one particular close fitting network model
<--raw unfiltered data in whatever format
data cleanup
308
<--harmonized, unified, error-corrected, standardized
purchased and imported
310
data enrichment
<--interpolations, extrapolations
312
trainable general payment fraud model
314
fraud model
classification model
classification model
classification model
build smart-agent population
build long-term profiles
330
331
332
334
336
316
317
318
319
320
321
322
323
classification model
build smart-agent population
build long-term profiles
fraud model

SMART RETAIL ANALYTICS AND COMMERCIAL MESSAGING

RELATED APPLICATIONS

The current patent application is a continuation patent application which claims priority benefit with regard to all common subject matter to identically-titled U.S. patent application Ser. No. 14/522,463, filed Oct. 23, 2014, which claims priority benefit with regard to all common subject matter to U.S. patent application Ser. No. 14/243,097, entitled SMART ANALYTICS FOR AUDIENCE-APPROPRIATE COMMERCIAL MESSAGING and filed Apr. 2, 2014. The listed earlier-filed non-provisional applications are hereby incorporated by reference in their entireties into the current patent application.

BACKGROUND OF THE INVENTION

Field of the Invention

The present invention relates to automated systems for understanding customer needs from their online behaviors, and more particularly to software-as-a-service merchant systems able to formulate suitable commercial messages and offers to merchants' customers.

Background

Commercial messages that have no relevance or importance to a consumer are easy for them to ignore and dismiss. Do it enough, and the consumers will get annoyed by the noise. Consumers have learned to tune out when they have been bombarded with rudderless billboards, letters, radio and TV spots, and now emails and pop ups on webpages. Very rarely does something interesting or relevant present itself, and those that do get tossed out with the ad hoc spam filters we all create.

People generally behave in consistent ways that make their future behaviors predictable, at least to some extent. Consumer behavior and predictions are bit easier to observe and to forecast because sales data is very objective. Messages generated from these observations and forecasts would also be better received since they would be more business-like and less personal. Insulting, embarrassing, and intimidating messages will, of course, completely turn off anyone, so messages that could have these affects are to be scrupulously avoided if one hopes to succeed in a line of business.

Herein we use the term "smart agent" to describe our own unique construct in a fraud detection system. Intelligent agents, software agents, and smart agents described in the prior art and used in conventional applications are not at all the same.

Sometimes all we know about someone is what can be inferred by the silhouettes and shadows they cast and the footprints they leave. Who is behind a credit card or payment transaction is a lot like that. We can only know and understand them by the behaviors that can be gleaned from the who, what, when, where, and (maybe) why of each transaction and series of them over time.

Cardholders will each individually settle into routine behaviors, and therefore their payment card transactions will follow those routines. All cardholders, as a group, are roughly the same and produce roughly the same sorts of transactions. But on closer inspection the general population of cardholders will cluster into various subgroups and behave in similar ways as manifested in the transactions they generate.

Card issuers want to encourage cardholders to use their cards, and want to stop and completely eliminate fraudsters from being able to pose as legitimate cardholders and get away with running transactions through to payment. So card issuers are challenged with being able to discern who is legitimate, authorized, and presenting a genuine transaction, from the clever and aggressive assaults of fraudsters who learn and adapt all too quickly. All the card issuers have before them are the millions of innocuous transactions flowing in every day.

What is needed is a fraud management system that can tightly follow and monitor the behavior of all cardholders and act quickly in real-time when a fraudster is afoot.

SUMMARY OF THE INVENTION

Briefly, an artificial intelligence fraud management solution embodiment of the present invention comprises a development system to generate a population of virtual smart agents corresponding to every cardholder, merchant, and device ID that hinted at during modeling and training. Each smart agent is nothing more than a pigeonhole and summation of various aspects of every transaction in a real-time profile of less than ninety days and a long-term profile of transactions older than ninety days. Actors and entities are built of no more than the attributes the express in each transaction. In fact, smart agents themselves take no action on their own and are not capable of gesticulations. They are merely attributes, descriptors, what can be seen on the surface.

The above and still further objects, features, and advantages of the present invention will become apparent upon consideration of the following detailed description of specific embodiments thereof, especially when taken in conjunction with the accompanying drawings.

BRIEF DESCRIPTION OF THE DRAWINGS

FIG. 3 is functional block diagram of a model training embodiment of the present invention;

DETAILED DESCRIPTION OF THE INVENTION

Figure 1:
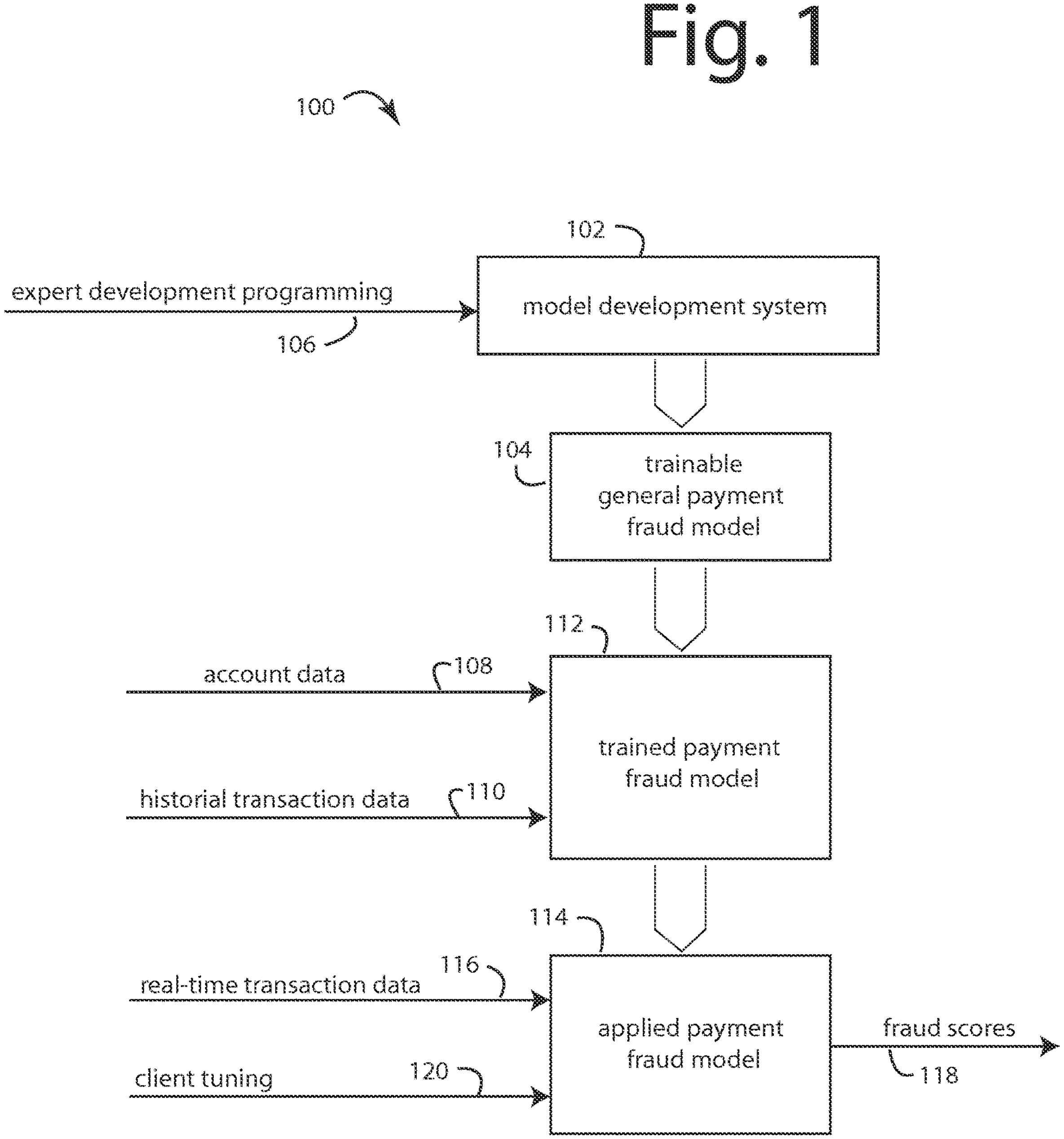
FIG. 1 is functional block diagram of an artificial intelligence fraud management solution embodiment of the present invention.

Smart agent embodiments of the present invention recognize that the actors and entities behind payment transactions can be fully understood in their essential aspects by way of the attributes reported in each transaction. Nothing else is of much importance, and very little more is usually unavailable anyway.

A legitimate cardholder and any fraudster are in actuality two different people and will behave in two different ways. They each will manifest transactions that will often reflect those differences. Fraudsters have far different agendas and purposes in their transactions than do legitimate cardholders, and so that can cast spotlights. But sometimes legitimate cardholders innocently generate transactions that look like a fraudster was responsible, and sometimes fraudsters succeed at being a wolf-in-sheep's-clothing. Getting that wrong will produce false positives and false negatives in an otherwise well performing fraud management payment system.

In the vast majority of cases, the legitimate cardholders will be completely unknown and anonymous to the fraudster and bits of knowledge about social security numbers, CVV numbers, phone numbers, zipcodes, and passwords will be impossible or expensive to obtain. And so they will be effective as a security factor that will stop fraud. But fraudsters that are socially close to the legitimate cardholder can have those bits within easy reach.

Occasionally each legitimate cardholder will step way out-of-character and generate a transaction that looks suspicious or downright fraudulent. Often such transactions can be forecast by previous such outbursts that they or their peers engaged in.

Embodiments of the present invention generate a population of virtual smart agents corresponding to every cardholder, merchant, and device ID that hinted at during modeling and training. Each smart agent is nothing more than a pigeonhole and summation of various aspects of every transaction in a real-time profile of less than ninety days and a long-term profile of transactions older than ninety days. Actors and entities are built of no more than the attributes the express in each transaction. In fact, smart agents themselves take no action on their own and are not capable. They are merely attributes, descriptors, what can be seen on the surface.

In this description here, smart agent embodiments of the present invention are nothing like the smart agents, intelligent agents, or software agents described by artificial intelligence researchers in the Literature.

The collecting, storing, and accessing of the transactional attributes of millions of smart agents engaging in billions of transactions is a challenge for conventional hardware platforms. Our earlier filed United States patent applications provide practical details on how a working system platform to host our smart agents can be built and programmed. For example, U.S. patent application Ser. No. 14/521,386, filed 22 Oct. 2014, and titled, Reducing False Positives with Transaction Behavior Forecasting; and also Ser. No. 14/520,361, filed 22 Oct. 2014, and titled Fast Access Vectors In Real-Time Behavioral Profiling.

At the most elementary level, each smart agent begins as a list of transactions for the corresponding actor or entity that were sorted from the general inflow of transactions. Each list becomes a profile and various velocity counts are pre-computed to make later real-time access more efficient and less burdensome. For example, a running total of the transactions is maintained as an attribute datapoint, as are the minimums, maximums, and averages of the dollar amounts of all long term or short term transactions. The frequency of those transactions per atomic time interval is also preprocessed and instantly available in any time interval. The frequencies of zipcodes involved in transactions is another velocity count. The radius of those zipcodes around the cardholders home zipcode can be another velocity count from a pre-computation.

So, each smart agent is a two-dimensional thing in virtual memory expressing attributes and velocity counts in its width and time intervals and constituent transactions in its length. As time moves to the next interval, the time intervals in every smart agent are effectively shift registered ad pushed down.

The smart agent profiles can be data mined for purchasing patterns, e.g., airline ticket purchases are always associated with car rentals and hotel charges. Concert ticket venues are associated with high end restaurants and bar bills. These patterns can form behavioral clusters useful in forecasting.

FIG. 1 represents an artificial intelligence fraud management solution embodiment of the present invention, and is referred to herein by the general reference numeral 100. Such solution 100 comprises an expert programmer development system 102 for building trainable general payment fraud models 104 that integrate several, but otherwise blank artificial intelligence classifiers, e.g., neural networks, case based reasoning, decision trees, genetic algorithms, fuzzy logic, and rules and constraints. These are further integrated by the expert programmers inputs 106 and development system 102 to include smart agents and associated real-time profiling, recursive profiles, and long-term profiles.

The trainable general payment fraud models 104 are trained with supervised and unsupervised data 108 and 110 to produce a trained payment fraud model 112. For example, accountholder and historical transaction data. This trained payment fraud model 112 can then be sold as a computer program library or a software-as-a-service applied payment fraud model. This then is applied by a commercial client in an applied payment fraud model 114 to process real-time transactions and authorization requests 116 for fraud scores. The applied payment fraud model 114 is further able to accept a client tuning input 120.

Figure 2A:
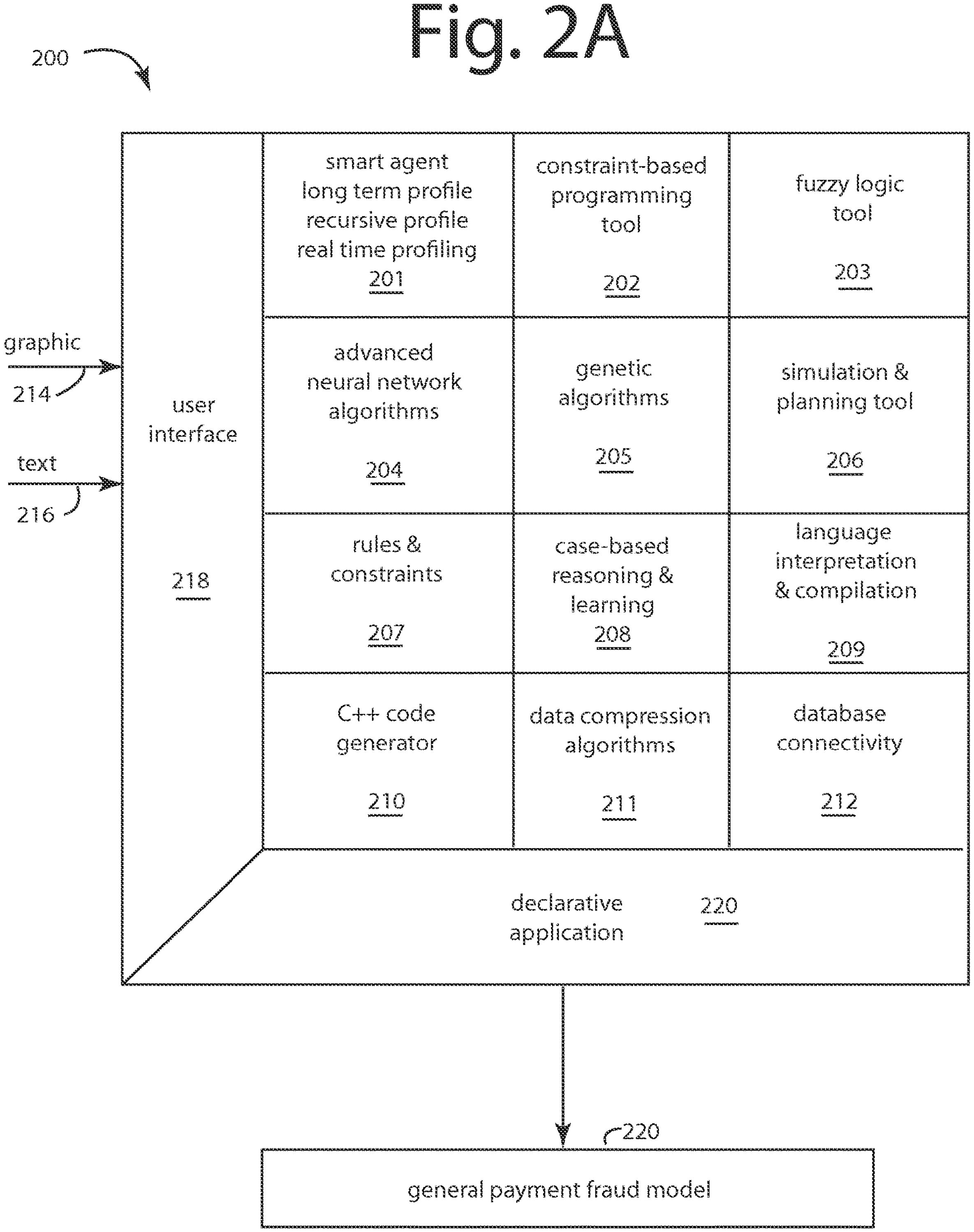
FIG. 2A is functional block diagram of an application development system (ADS) embodiment of the present invention for fraud-based target applications.

FIG. 2A represents an application development system (ADS) embodiment of the present invention for fraud-based target applications, and is referred to herein by the general reference numeral 200. Such is the equivalent of development system 102 in FIG. 1. ADS 200 comprises a number of computer program development libraries and tools that highly skilled artificial intelligence scientists and artisans can manipulate into a novel combination of complementary technologies. In an early embodiment of ADS 200 we combined a goal-oriented multi-agent technology 201 for building run-time smart agents, a constraint-based programming tool 202, a fuzzy logic tool 203, a library of genetic algorithms 205, a simulation and planning tool 206, a library of business rules and constraints 207, case-based reasoning and learning tools 208, a real-time interpreted language compiler 209, a C++ code generator 210, a library of data compression algorithms 211, and a database connectivity tool 212.

The highly skilled artificial intelligence scientists and artisans provide graphical and textual inputs 214 and 216 to a user interface (UI) 218 to manipulate the novel combinations of complementary technologies into a declarative application 220.

Declarative application 214 is molded, modeled, simulated, tested, corrected, massaged, and unified into a fully functional hybrid combination that is eventually output as a trainable general payment fraud model 222. Such is the equivalent of trainable general payment fraud model 104 in FIG. 1.

It was discovered by the present inventor that the highly skilled artificial intelligence scientists and artisans that could manipulate the complementary technologies mentioned into specific novel combinations required exceedingly talented individuals that were in short supply.

It was, however, possible to build and to prove out that ADS 200 as a compiler would produce trainable general payment fraud models 220, and these were more commercially attractive and viable.

After many years of experimental use and trials, ADS 200 was constantly improved and updated. Database connectivity tool 212, for example, tried to press conventional databases into service during run-time to receive and supply datapoints in real-time transaction service. It turned out no conventional databases were up to it.

Figure 2B:
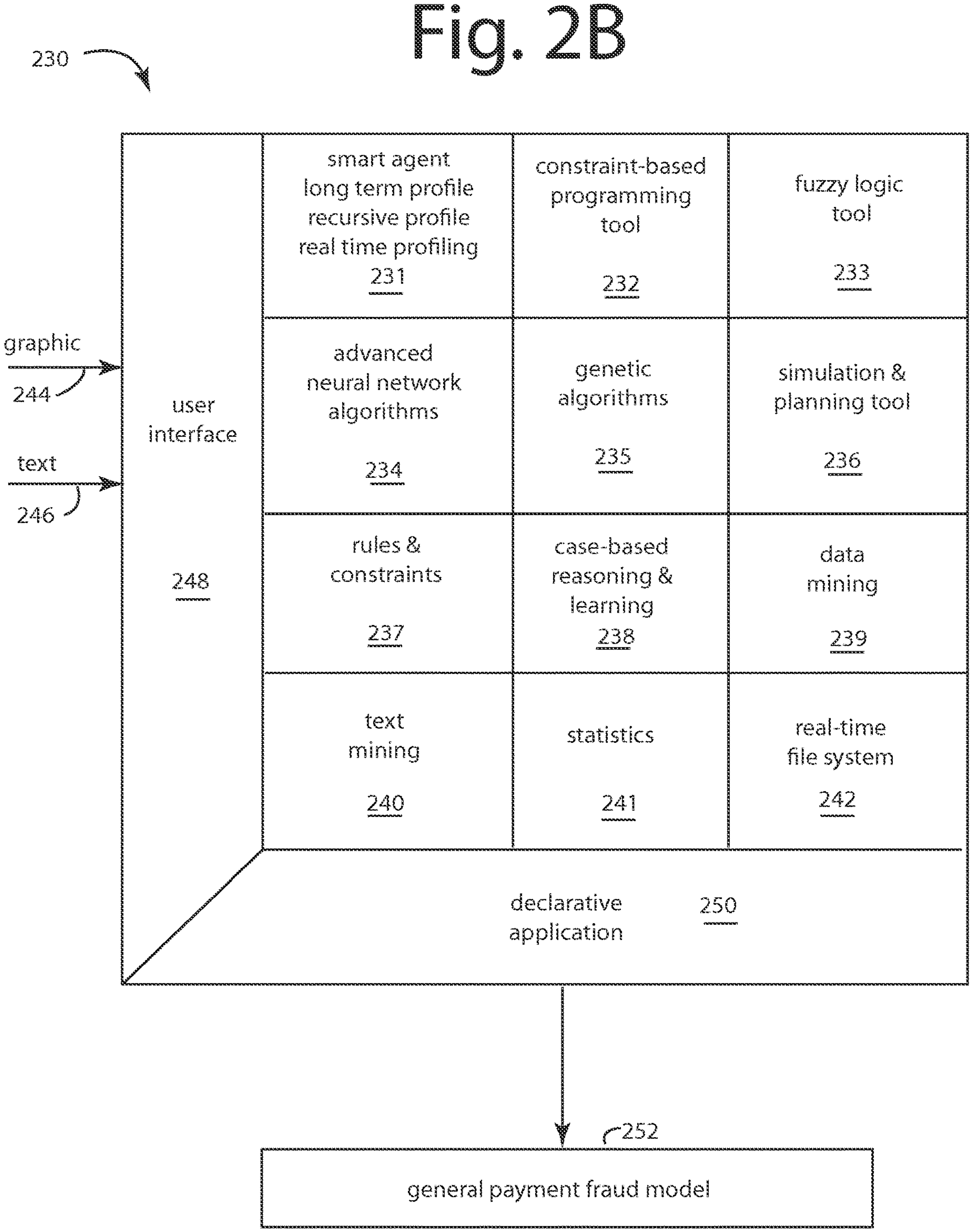
FIG. 2B is functional block diagram of an improved and updated application development system (ADS) embodiment of the present invention for fraud-based target applications.

At the present, an updated and improved ADS shown with general reference numeral 230 in FIG. 2B is providing better and more useful trainable general payment fraud models.

ADS 230 is the most recent equivalent of development system 102 in FIG. 1. ADS 230 assembles together a different mix of computer program development libraries and tools for the highly skilled artificial intelligence scientists and artisans to manipulate into a new hybrid of still complementary technologies.

In this later embodiment, ADS 230, we combined an improved smart-agent technology 231 for building run-time smart agents that are essentially only silhouettes of their constituent attributes. These attributes are themselves smart-agents with second level attributes and values that are able to "call" on real-time profilers, recursive profilers, and long term profilers. Such profilers can provide comparative assessments of each datapoint with the new information flowing in during run-time. In general, "real-time" profiles include transactions less than ninety days old. Long-term profiles accumulate transactions over ninety days old. In some applications, the line of demarcation was forty-five days, due to data storage concerns. Recursive profiles are those that inspect what an entity's peers have done in comparison.

The three profilers can thereafter throw exceptions in each datapoint category, and the number and quality of exceptions thrown across the breadth of the attributes then incoming will produce a fraud risk score that generally raises exponentially with that number of exceptions thrown. Oracle explains in C++ programming that exceptions provide a way to react to exceptional circumstances (like fraud suspected) in programs by transferring control to special functions called "handlers".

At the top level of a hierarchy of smart agents linked by their attributes are the smart agents for the independent actors who can engage in fraud. In a payment fraud model, that top level will be the cardholders as tracked by the cardholder account numbers reported in transaction data.

These top level smart agents can call on a moving 15-minute window file that has all the transactions reported to the system in the last 15-minutes. Too much activity in 15-minutes by any one actor is cause for further inspection and analysis.

ADS 230 further comprises a constraint-based programming tool 232, a fuzzy logic tool 233, a library of advanced neural network algorithms 234, a library of genetic algorithms 235, a simulation and planning tool 236, a library of business rules and constraints 237, case-based reasoning and learning tools 238, a data mining tool 239, a text mining tool 240, a statistical tool 241 and a real-time file system 242.

The real-time file system 242 is a simple organization of attribute values for smart agent profilers that allow quick, direct file access.

The highly skilled artificial intelligence scientists and artisans provide graphical and textual inputs 244 and 246 to a user interface (UI) 248 to manipulate the novel combinations of complementary technologies into a declarative application 250.

Declarative application 250 is also molded, modeled, simulated, tested, corrected, massaged, and unified into a fully functional hybrid combination that is eventually output as a trainable general payment fraud model 252. Such is also the more improved equivalent of trainable general payment fraud model 104 in FIG. 1.

The constraint-based programming tools 202 and 232 limit the number of possible solutions. Complex conditions with complex constraints can create an exponential number of possibilities. Fixed constraints, fuzzy constraints, and polynomials are combined in cases where no exact solution exists. New constraints can be added or deleted at any time. The dynamic nature of the tool makes possible real-time simulations of complex plans, schedules, and diagnostics.

The constraint-based programming tools are written as a very complete language in its own right. It can integrate a variety of variables and constraints, as in the following Table.

| |
|---|
| Variables: Real, with integer values, enumerated, sets, matrices and. vectors, intervals, fuzzy subsets, and more. |
| Arithmetic Constraints: =, +, −, *, /, /=, >, <, >=, <=, interval addition, interval subtraction, interval multiplication and interval division, max, min, intersection, union, exponential, modulo, logarithm, and more. |
| Temporal (Allen) Constraints: Control allows you to write any temporal constraints including Equal, N-equal, Before, |

-continued

| |
|---|
| After, Meets, Overlaps, Starts, Finishes, and personal temporal operators such as Disjoint, Started-by, Overlapped-by, Met-by, Finished-by, and more. |
| Boolean Constraints: Or, And, Not, XOR, Implication, Equivalence |
| Symbolic Constraints: Inclusion, Union, Intersection, Cardinality, Belonging, and more. |

The constraint-based programming tools 202 and 232 include a library of ways to arrange subsystems, constraints and variables. Control strategies and operators can be defined within or outside using traditional languages such as C, C++, FORTRAN, etc. Programmers do not have to learn a new language, and provides an easy-to-master programming interface by providing an in-depth library and traditional tools.

Fuzzy logic tools 203 and 233 recognize many of the largest problems in organizations cannot be solved by simple yes/no or black/white answers. Sometimes the answers need to be rendered in shades of gray. This is where fuzzy logic proves useful. Fuzzy logic handles imprecision or uncertainty by attaching various measures of credibility to propositions. Such technology enables clear definitions of problems where only imperfect or partial knowledge exists, such as when a goal is approximate, or between all and nothing. In fraud applications, this can equate to the answer being "maybe" fraud is present, and the circumstances warrant further investigation.

Tools 204 and 234 provides twelve different neural network algorithms, including Back propagation, Kohonen, Art, Fuzzy ART, RBF and others, in an easy-to-implement C++ library. Neural networks are algorithmic systems that interpret historical data to identify trends and patterns against which to compare subject cases. The libraries of advanced neural network algorithms can be used to translate databases to neurons without user intervention, and can significantly accelerate the speed of convergence over conventional back propagation, and other neural network algorithms. The present invention's neural net is incremental and adaptive, allowing the size of the output classes to change dynamically. An expert mode in the advanced application development tool suite provides a library of twelve different neural network models for use in customization.

Neural networks can detect trends and patterns other computer techniques are unable to. Neurons work collaboratively to solve the defined problem. Neural networks are adept in areas that resemble human reasoning, making them well suited to solve problems that involve pattern recognition and forecasting. Thus, neural networks can solve problems that are too complex to solve with conventional technologies.

Libraries 205 and 235 include genetic algorithms to initialize a population of elements where each element represents one possible set of initial attributes. Once the models are designed based on these elements, a blind test performance is used as the evaluation function. The genetic algorithm will be then used to select the attributes that will be used in the design of the final models. The component particularly helps when multiple outcomes may achieve the same predefined goal. For instance, if a problem can be solved profitably in any number of ways, genetic algorithms can determine the most profitable way.

Simulation and planning tool 206 can be used during model designs to check the performances of the models.

Business rules and constraints 207 provides a central storage of best practices and know how that can be applied to current situations. Rules and constraints can continue to be captured over the course of years, applying them to the resolution of current problems.

Case-based reasoning 208 uses past experiences in solving similar problems to solve new problems. Each case is a history outlined by its descriptors and the steps that lead to a particular outcome. Previous cases and outcomes are stored and organized in a database. When a similar situation presents itself again later, a number of solutions that can be tried, or should be avoided, will present immediately. Solutions to complex problems can avoid delays in calculations and processing, and be offered very quickly.

Language interpretation tool 209 provides a constant feedback and evaluation loop. Intermediary Code generator 210 translates Declarative Applications 214 designed by any expert into a faster program 230 for a target host 232.

During run-time, real time transaction data 234 can be received and processed according to declarative application 214 by target host 232 with the objective of producing run-time fraud detections 236. For example, in a payments application card payments transaction requests from merchants can be analyzed for fraud activity. In healthcare applications the reports and compensation demands of providers can be scanned for fraud. And in insider trader applications individual traders can be scrutinized for special knowledge that could have illegally helped them profit from stock market moves.

File compression algorithms library 211 helps preserve network bandwidth by compressing data at the user's discretion.

FIG. 3 represents a model training embodiment of the present invention, and is referred to herein by the general reference numeral 300. Model trainer 300 can be fed a very complete, comprehensive transaction history 302 that can include both supervised and unsupervised data. A filter 304 actually comprises many individual filters that can be selected by a switch 306. Each filter can separate the supervised and unsupervised data from comprehensive transaction history 302 into a stream correlated by some factor in each transaction.

The resulting filtered training data will produce a trained model that will be highly specific and sensitive to fraud in the filtered category. When two or more of these specialized trained models used in parallel are combined in other embodiments of the present invention they will excel in real-time cross-channel fraud prevention.

In a payment card fraud embodiment of the present invention, during model training, the filters 304 are selected by switch 306 to filter through dozens of different channels, one-at-a-time for each real-time, risk-scoring channel model that will be needed and later run together in parallel. For example, such channels can include channel transactions and authorization requests for card-not-present, card-present, high risk merchant category code (MCC), micro-merchant, small and medium sized enterprise (SME) finance, international, domestic, debit card, credit card, contactless, or other groupings or financial networks.

The objective here is to detect a first hint of fraud in any channel for a particular accountholder, and to "warn" all the other real-time, risk-scoring channel models that something suspicious is occurring with this accountholder. In one embodiment, the warning comprises an update in the nature of feedback to the real-time, long-term, and recursive profiles for that accountholder so that all the real-time, risk-scoring channel models step up together increment the risk thresholds that accountholder will be permitted. More hits in more channels should translate to an immediate alert and shutdown of all the affected accountholders accounts.

Competitive prior art products make themselves immediately unattractive and difficult to use by insisting that training data suit some particular format. In reality, training data will come from multiple, disparate, dissimilar, incongruent, proprietary data sources simultaneously. A data cleanup process 308 is therefore important to include here to do coherence analysis, and to harmonize, unify, error-correct, and otherwise standardize the heterogeneous data coming from transaction data history 302. The commercial advantage of that is a wide range of clients with many different channels can provide their transaction data histories 302 in whatever formats and file structures are natural to the provider. It is expected that embodiments of the present invention will find applications in financial services, defense and cyber security, health and public service, technology, mobile payments, retail and e-commerce, marketing and social networking, and others.

A data enrichment process 310 computes interpolations and extrapolations of the training data, and expands it out to as many as two-hundred and fifty datapoints from the forty or so relevant datapoints originally provided by transaction data history 302.

A trainable fraud model 312 (like that illustrated in FIG. 1 as trainable general payment fraud model 104) is trained into a channel specialized fraud model 314, and each are the equivalent of the applied fraud model 114 illustrated in FIG. 1. The selected training results from the switch 306 setting and the filters 304 then existing.

Channel specialized fraud models 314 can be sold individually or in assorted varieties to clients, and then imported by them as a commercial software app, product, or library.

A variety of selected applied fraud models 316-323 represent the applied fraud models 114 that result with different settings of filter switch 306. Each selected applied fraud model 314 will include a hybrid of artificial intelligence classification models represented by models 330-332 and a smart-agent population build 334 with a corresponding set of real-time, recursive, and long-term profilers 336. The enriched data from data enrichment process 310 is fully represented in the smart-agent population build 334 and profilers 336.

Figure 4:
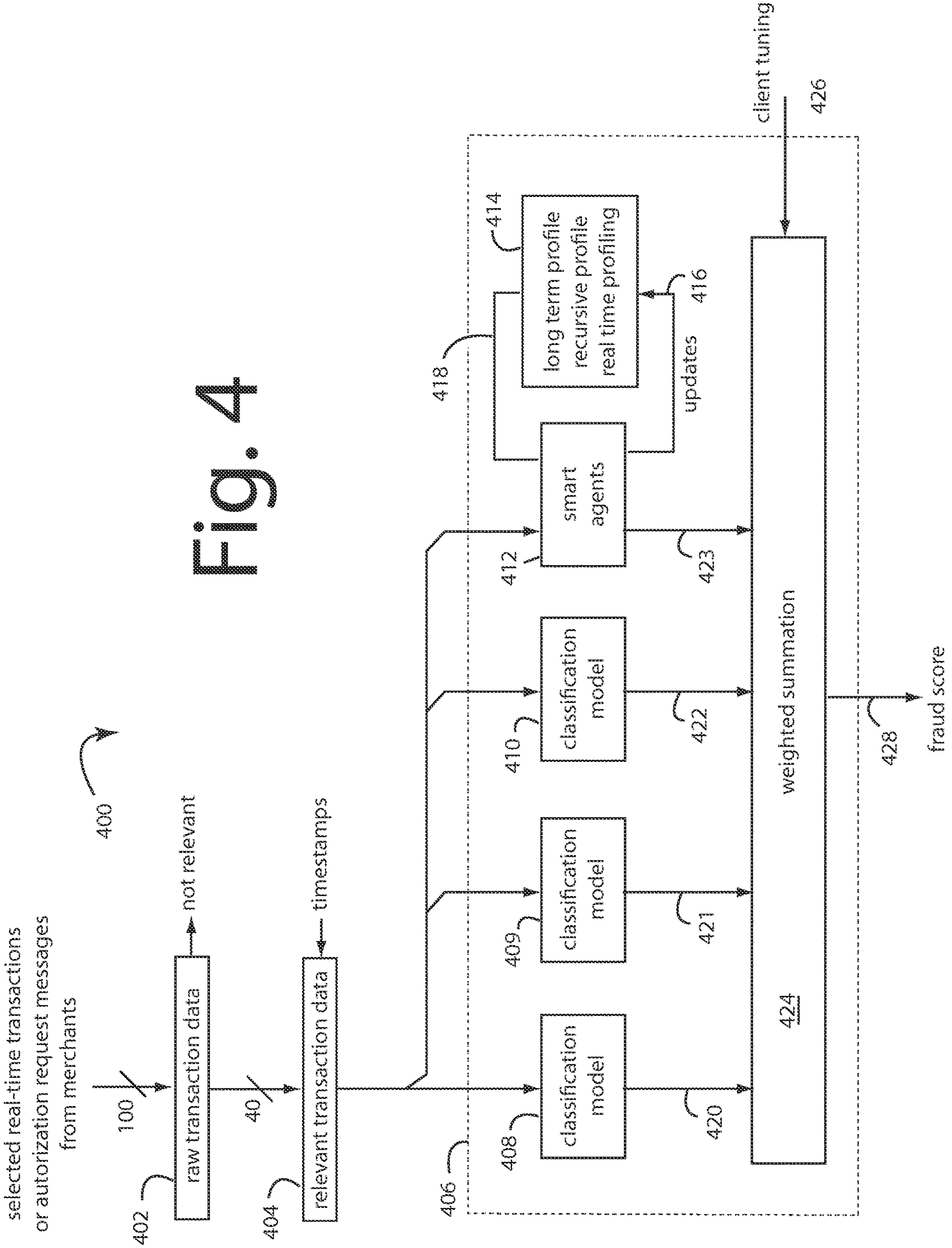
FIG. 4 is functional block diagram of a real-time payment fraud management system like that illustrated in FIG. 1 as applied payment fraud model.

FIG. 4 represents a real-time payment fraud management system 400 like that illustrated in FIG. 1 as applied payment fraud model 114. A raw transaction separator 402 filters through the forty or so data items that are relevant to the computing of a fraud score. A process 404 adds timestamps to these relevant datapoints and passes them in parallel to a selected applied fraud model 406. This is equivalent to a selected one of applied fraud models 316-323 in FIG. 3 and applied payment fraud model 114 in FIG. 1.

During a session in which the time-stamped relevant transaction data flows in, a set of classification models 408-410 operate independently according to their respective natures. A population of smart agents 412 and profilers 414 also operate on the time-stamped relevant transaction data inflows. Each new line of time-stamped relevant transaction data will trigger an update 416 of the respective profilers 414. Their attributes 418 are provided to the population of smart agents 412.

The classification models 408-410 and population of smart agents 412 and profilers 414 all each produce an independent and separate vote or fraud score 420-423 on the same line of time-stamped relevant transaction data. A weighted summation processor 424 responds to client tunings 426 to output a final fraud score 428.

Figure 5:
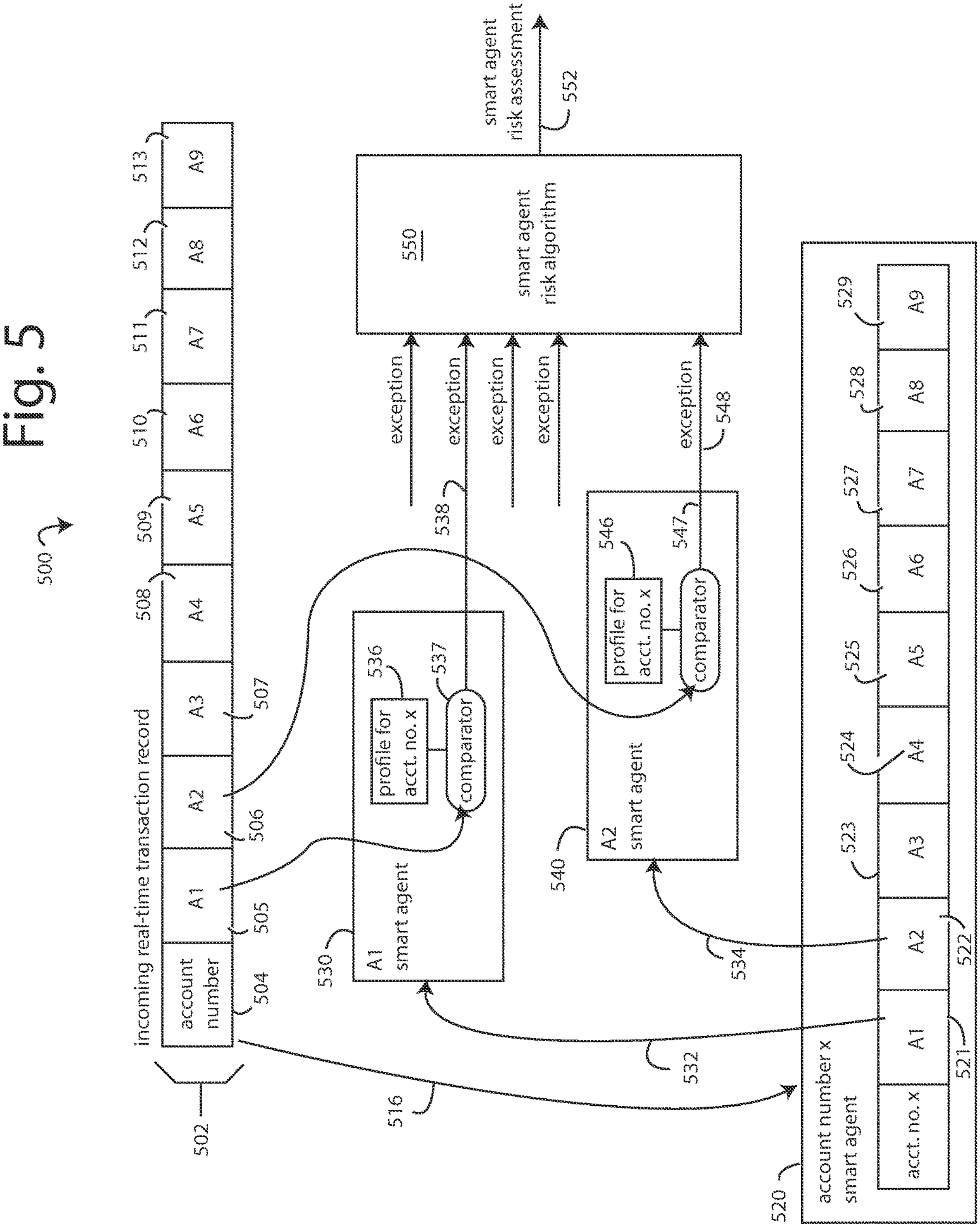
FIG. 5 is functional block diagram of a smart agent process embodiment of the present invention.

FIG. 5 represents a smart agent process 500 in an embodiment of the present invention. For example, these would include the smart agent population build 334 and profiles 336 in FIG. 3 and smart agents 412 and profiles 414 in FIG. 4. A series of payment card transactions arriving in real-time in an authorization request message is represented here by a random instantaneous incoming real-time transaction record 502.

Such record 502 begins with an account number 504. It includes attributes A1-A9 numbered 505-513 here. These attributes, in the context of a payment card fraud application would include datapoints for card type, transaction type, merchant name, merchant category code (MCC), transaction amount, time of transaction, time of processing, etc.

Account number 504 in record 502 will issue a trigger 516 to a corresponding smart agent 520 to present itself for action. Smart agent 520 is simply a constitution of its attributes, again A1-A9 and numbered 521-529 in FIG. 5. These attributes A1-A9 521-529 are merely pointers to attribute smart agents. Two of these, one for A1 and one for A2, are represented in FIG. 5. Here, an A1 smart agent 530 and an A2 smart agent 540. These are respectively called into action by triggers 532 and 542.

A1 smart agent 530 and A2 smart agent 540 will respectively fetch correspondent attributes 505 and 506 from incoming real-time transaction record 502. Smart agents for A3-A9 make similar fetches to themselves in parallel. They are not shown here to reduce the clutter for FIG. 5 that would otherwise result.

Each attribute smart agent like 530 and 540 will include or access a corresponding profile datapoint 536 and 546. This is actually a simplification of the three kinds of profiles 336 (FIG. 3) that were originally built during training and updated in update 416 (FIG. 4). These profiles are used to track what is "normal" behavior for the particular account number for the particular single attribute.

For example, if one of the attributes reports the MCC's of the merchants and another reports the transaction amounts, then if the long-term, recursive, and real time profiles for a particular account number x shows a pattern of purchases at the local Home Depot and Costco that average $100-$300, then an instantaneous incoming real-time transaction record 502 that reports another $200 purchase at the local Costco will raise no alarms. But a sudden, unique, inexplicable purchase for $1250 at a New York Jeweler will and should throw more than one exception.

Each attribute smart agent like 530 and 540 will further include a comparator 537 and 547 that will be able to compare the corresponding attribute in the instantaneous incoming real-time transaction record 502 for account number x with the same attributes held by the profiles for the same account. Comparators 537 and 547 should accept some slack, but not too much. Each can throw an exception 538 and 548, as can the comparators in all the other attribute smart agents. It may be useful for the exceptions to be a fuzzy value, e.g., an analog signal 0.0 to 1.0. Or it could be a simple binary one or zero. What sort of excursions should trigger an exception is preferably adjustable, for example with client tunings 426 in FIG. 4.

These exceptions are collected by a smart agent risk algorithm 550. One deviation or exception thrown on any one attribute being "abnormal" can be tolerated if not too egregious. But two or more should be weighted more than just the simple sum, e.g., $(1+1)^n=2^n$ instead of simply 1+1=2. The product is output as a smart agent risk assessment 552.

This output is the equivalent of independent and separate vote or fraud score 423 in FIG. 4.

Figure 6:
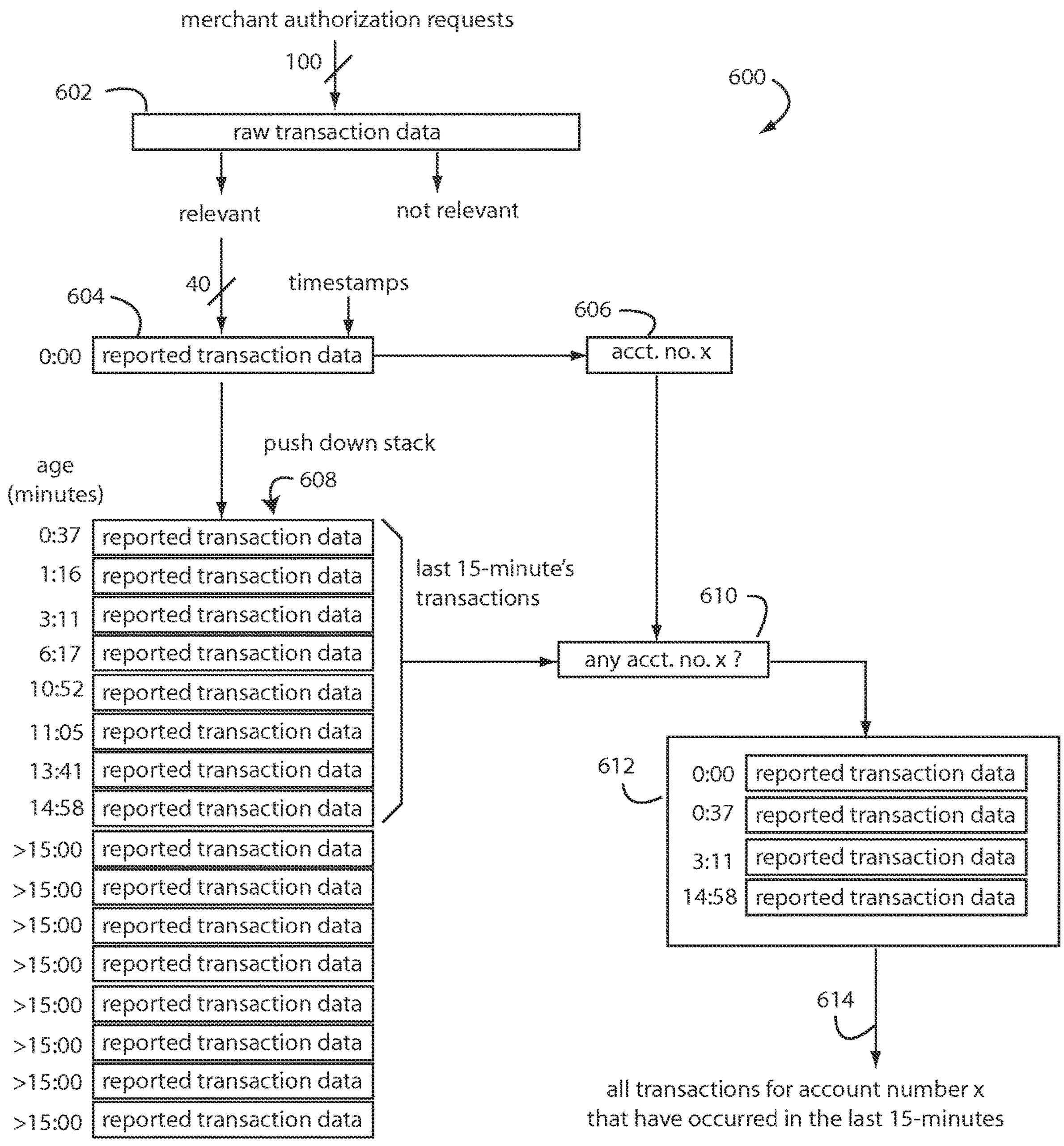
FIG. 6 is functional block diagram of a most recent fifteen-minute transaction velocity counter.

FIG. 6 represents a most recent 15-minute transaction velocity counter 600, in an embodiment of the present invention. It receives the same kind of real-time transaction data inputs as were described in connection with FIG. 4 as raw transaction data 402 and FIG. 5 as records 502. A raw transaction record 602 includes a hundred or so datapoints. About forty of those datapoints are relevant to fraud detection an identified in FIG. 6 as reported transaction data 604.

The reported transaction data 604 arrive in a time series and randomly involve a variety of active account numbers. But, let's say the most current reported transaction data 604 with a time age of 0:00 concerns a particular account number x. That fills a register 606.

Earlier arriving reported transaction data 604 build a transaction time-series stack 608. FIG. 6 arbitrarily identifies the respective ages of members of transaction time-series stack 608 with example ages 0:73, 1:16, 3:11, 6:17, 10:52, 11:05, 13:41, and 14:58. Those aged more than 15-minutes are simply identified with ages ">15:00". This embodiment of the present invention is concerned with only the last 15-minutes worth of transactions. As time passes transaction time-series stack 608 pushes down.

The key concern is whether account number x has been involved in any other transactions in the last 15-minutes. A search process 610 accepts a search key from register 606 and reports any matches in the most 15-minute window with an account activity velocity counter 612. Too much very recent activity can hint there is a fraudster at work, or it may be normal behavior. A trigger 614 is issued that can be fed to an additional attribute smart agent that is included with attributes smart agents 530 and 540 and the others in parallel. Exception from this new account activity velocity counter smart agent is input to smart agent risk algorithm 550 in FIG. 5.

Figure 7:
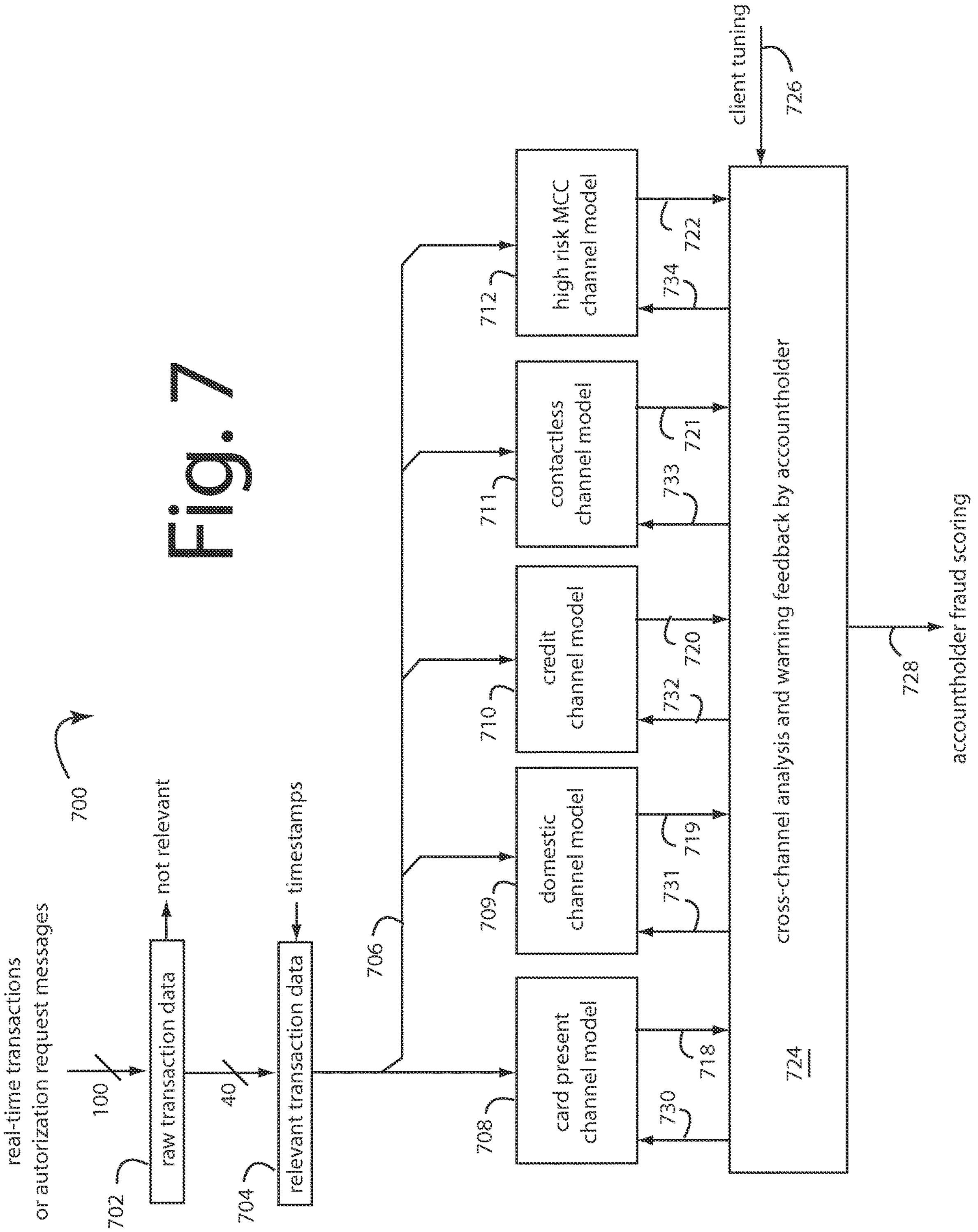
FIG. 7 is functional block diagram of a cross-channel payment fraud management embodiment of the present invention.

FIG. 7 represents a cross-channel payment fraud management embodiment of the present invention, and is referred to herein by general reference numeral 700.

Real-time cross-channel monitoring uses track cross channel and cross product patterns to cross pollinate information for more accurate decisions. Such track not only the channel where the fraud ends but also the initiating channel to deliver a holistic fraud monitoring. A standalone internet banking fraud solution will allow a transaction if it is within its limits, however if core banking is in picture, then it will stop this transaction, as we additionally know the source of funding of this account (which mostly in missing in internet banking).

In FIG. 3, a variety of selected applied fraud models 316-323 represent the applied fraud models 114 that result with different settings of filter switch 306. A real-time cross-channel monitoring payment network server can be constructed by running several of these selected applied fraud models 316-323 in parallel.

FIG. 7 represents a real-time cross-channel monitoring payment network server 700, in an embodiment of the present invention. Each customer or accountholder of a financial institution can have several very different kinds of accounts and use them in very different transactional channels. For example, card-present, domestic, credit card, contactless, and high risk MCC channels. So in order for a cross-channel fraud detection system to work at its best, all the transaction data from all the channels is funneled into one pipe for analysis.

Real-time transactions and authorization requests data is input and stripped of irrelevant datapoints by a process 702. The resulting relevant data is time-stamped in a process 704. The 15-minute vector process of FIG. 6 may be engaged at this point in background. A bus 706 feeds the data in parallel line-by-line, e.g., to a selected applied fraud channel model for card present 708, domestic 709, credit 710, contactless 711, and high risk MCC 712. Each can pop an exception to the current line input data with an evaluation flag or score 718-722. The involved accountholder is understood.

These exceptions are collected and analyzed by a process 724 that can issue warning feedback for the profiles maintained for each accountholder. Each selected applied fraud channel model 708-712 shares risk information about particular accountholders with the other selected applied fraud models 708-712. A suspicious or outright fraudulent transaction detected by a first selected applied fraud channel model 708-712 for a particular customer in one channel is cause for a risk adjustment for that same customer in all the other applied fraud models for the other channels.

Exceptions 718-722 to an instant transactions on bus 706 trigger an automated examination of the customer or accountholder involved in a profiling process 724, especially with respect to the 15-minute vectors and activity in the other channels for the instant accountholder. A client tuning input 726 will affect an ultimate accountholder fraud scoring output 728, e.g., by changing the respective risk thresholds for genuine-suspicious-fraudulent.

A corresponding set of warning triggers 73-734 is fed back to all the applied fraud channel models 708-712. The compromised accountholder result 728 can be expected to be a highly accurate and early protection warning.

In general, a process for cross-channel financial fraud protection comprises training a variety of real-time, risk-scoring fraud models with training data selected for each from a common transaction history to specialize each member in the monitoring of a selected channel. Then arranging the variety of real-time, risk-scoring fraud models after the training into a parallel arrangement so that all receive a mixed channel flow of real-time transaction data or authorization requests. The parallel arrangement of diversity trained real-time, risk-scoring fraud models is hosted on a network server platform for real-time risk scoring of the mixed channel flow of real-time transaction data or authorization requests. Risk thresholds are immediately updated for particular accountholders in every member of the parallel arrangement of diversity trained real-time, risk-scoring fraud models when any one of them detects a suspicious or outright fraudulent transaction data or authorization request for the accountholder. So, a compromise, takeover, or suspicious activity of the accountholder's account in any one channel is thereafter prevented from being employed to perpetrate a fraud in any of the other channels.

Such process for cross-channel financial fraud protection can further comprise steps for building a population of real-time and a long-term and a recursive profile for each the accountholder in each the real-time, risk-scoring fraud models. Then during real-time use, maintaining and updating the real-time, long-term, and recursive profiles for each accountholder in each and all of the real-time, risk-scoring fraud models with newly arriving data. If during real-time use a compromise, takeover, or suspicious activity of the accountholder's account in any one channel is detected, then updating the real-time, long-term, and recursive profiles for each accountholder in each and all of the other real-time, risk-scoring fraud models to further include an elevated risk flag. The elevated risk flags are included in a final risk score calculation 728 for the current transaction or authorization request.

The 15-minute vectors described in FIG. 6 are a way to cross pollenate risks calculated in one channel with the others. The 15-minute vectors can represent an amalgamation of transactions in all channels, or channel-by channel. Once a 15-minute vector has aged, it can be shifted into a 30-minute vector, a one-hour vector, and a whole day vector by a simple shift register means. These vectors represent velocity counts that can be very effective in catching fraud as it is occurring in real time.

In every case, embodiments of the present invention include adaptive learning that combines three learning techniques to evolve the artificial intelligence classifiers, e.g., 408-414. First is the automatic creation of profiles, or smart-agents, from historical data, e.g., long-term profiling. See FIG. 3. The second is real-time learning, e.g., enrichment of the smart-agents based on real-time activities. See FIG. 4. The third is adaptive learning carried by incremental learning algorithms. See FIG. 7.

For example, two years of historical credit card transactions data needed over twenty seven terabytes of database storage. A smart-agent is created for each individual card in that data in a first learning step, e.g., long-term profiling. Each profile is created from the card's activities and transactions that took place over the two year period. Each profile for each smart-agent comprises knowledge extracted field-by-field, such as merchant category code (MCC), time, amount for an mcc over a period of time, recursive profiling, zip codes, type of merchant, monthly aggregation, activity during the week, weekend, holidays, Card not present (CNP) versus card present (CP), domestic versus cross-border, etc. this profile will highlights all the normal activities of the smart-agent (specific card).

Smart-agent technology has been observed to outperform conventional artificial and machine learning technologies. For example, data mining technology creates a decision tree from historical data. When historical data is applied to data mining algorithms, the result is a decision tree. Decision tree logic can be used to detect fraud in credit card transactions. But, there are limits to data mining technology. The first is data mining can only learn from historical data and it generates decision tree logic that applies to all the cardholders as a group. The same logic is applied to all cardholders even though each merchant may have a unique activity pattern and each cardholder may have a unique spending pattern.

A second limitation is decision trees become immediately outdated. Fraud schemes continue to evolve, but the decision tree was fixed with examples that do not contain new fraud schemes. So stagnant non-adapting decision trees will fail to detect new types of fraud, and do not have the ability to respond to the highly volatile nature of fraud.

Another technology widely used is "business rules" which requires actual business experts to write the rules, e.g., if-then-else logic. The most important limitations here are that the business rules require writing rules that are supposed to work for whole categories of customers. This requires the population to be sliced into many categories (students, seniors, zip codes, etc.) and asks the experts to provide rules that apply to all the cardholders of a category.

How could the US population be sliced? Even worse, why would all the cardholders in a category all have the same behavior? It is plain that business rules logic has built-in limits, and poor detection rates with high false positives. What should also be obvious is the rules are outdated as soon as they are written because conventionally they don't adapt at all to new fraud schemes or data shifts.

Neural network technology also limits, it uses historical data to create a matrix weights for future data classification. The Neural network will use as input (first layer) the historical transactions and the classification for fraud or not as an output). Neural Networks only learn from past transactions and cannot detect any new fraud schemes (that arise daily) if the neural network was not re-trained with this type of fraud. Same as data mining and business rules the classification logic learned from the historical data will be applied to all the cardholders even though each merchant has a unique activity pattern and each cardholder has a unique spending pattern.

Another limit is the classification logic learned from historical data is outdated the same day of its use because the fraud schemes changes but since the neural network did not learn with examples that contain this new type of fraud schemes, it will fail to detect this new type of fraud it lacks the ability to adapt to new fraud schemes and do not have the ability to respond to the highly volatile nature of fraud.

Contrary to previous technologies, smart-agent technology learns the specific behaviors of each cardholder and create a smart-agent that follow the behavior of each cardholder. Because it learns from each activity of a cardholder, the smart-agent updates the profiles and makes effective changes at runtime. It is the only technology with an ability to identify and stop, in real-time, previously unknown fraud schemes. It has the highest detection rate and lowest false positives because it separately follows and learns the behaviors of each cardholder.

Smart-agents have a further advantage in data size reduction. Once, say twenty-seven terabytes of historical data is transformed into smart-agents, only 200-gigabytes is needed to represent twenty-seven million distinct smart-agents corresponding to all the distinct cardholders.

Incremental learning technologies are embedded in the machine algorithms and smart-agent technology to continually re-train from any false positives and negatives that occur along the way. Each corrects itself to avoid repeating the same classification errors. Data mining logic incrementally changes the decision trees by creating a new link or updating the existing links and weights. Neural networks update the weight matrix, and case based reasoning logic updates generic cases or creates new ones. Smart-agents update their profiles by adjusting the normal/abnormal thresholds, or by creating exceptions.

In real-time behavioral profiling by the smart-agents, both the real-time and long-term engines require high speed transfers and lots of processor attention. Conventional database systems cannot provide the transfer speeds necessary, and the processing burdens cannot be tolerated.

Embodiments of the present invention include a fast, low overhead, custom file format and storage engine designed to retrieve profiles in real-time with a constant low load and save time. For example, the profiles 336 built in FIG. 3, and long-term, recursive, and real-time profiles 414 in FIG. 4.

Figure 8:
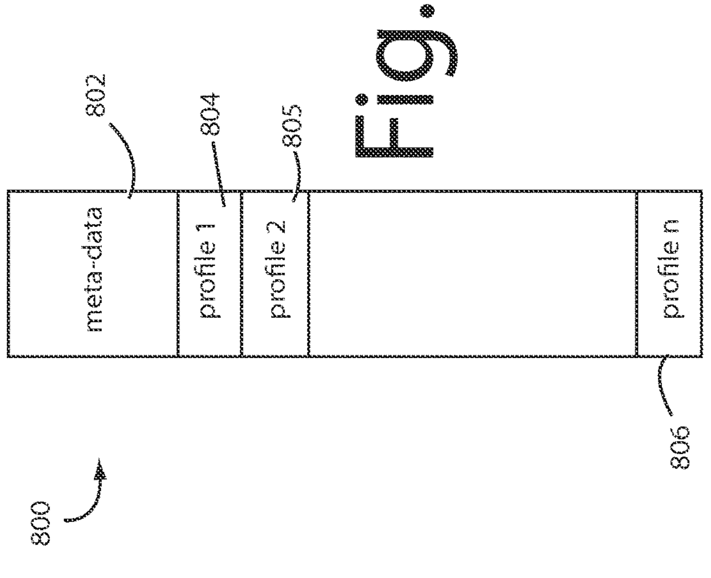
FIG. 8 is a diagram of a group of smart agent profiles stored in a custom binary file.

Referring now to FIG. 8, a group of smart agent profiles is stored in a custom binary file 800 which starts with a meta-data section 802 containing a profile definition, and a number of fixed size profile blocks, e.g., 804, 805, . . . 806 each containing the respective profiles. Such profiles are individually reserved to and used by a corresponding smart agent, e.g., profile 536 and smart agent 530 in FIG. 5. Fast file access to the profiles is needed on the arrival of every transaction 502. In FIG. 5, account number 504 signals the particular smart agents and profiles to access and that are required to provide a smart agent risk assessment 552 in real-time. For example, an approval or a denial in response to an authorization request message.

Figure 9:
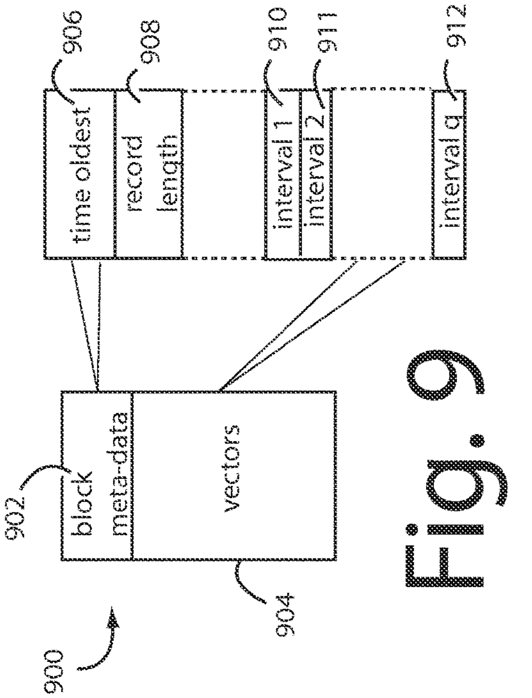
FIG. 9 is a diagram of the file contents of an exemplary smart agent profile.

FIG. 9 represents what's inside each such profile, e.g., a profile 900 includes a meta-data 902 and a rolling list of vectors 904. The meta-data 902 comprises the oldest one's time field 906, and a record length field 908. Transaction events are timestamped, recorded, and indexed by a specified atomic interval, e.g., ten minute intervals are typical, which is six hundred seconds. Each vector points to a run of profile datapoints that all share the same time interval, e.g., intervals 910-912. Some intervals will have no events, and therefor no vectors 904. Here, all the time intervals less than ninety days old are considered by the real-time (RT) profiles. Ones older than that are amalgamated into the respective long-term (LT) profiles.

What was purchased and how long ago a transaction for a particular accountholder occurred, and when their other recent transactions occurred can provide valuable insights into whether the transactions the accountholder is presently engaging in are normal and in character, or deviating. Forcing a fraud management and protection system to hunt a conventional database for every transaction a particular random accountholder engaged in is not practical. The accountholders' transactions must be pre-organized into their respective profiles so they are always randomly available for instant calculations. How that is made possible in embodiments of the present invention is illustrated here in FIGS. 5, 6, and 8-10.

Figure 10:
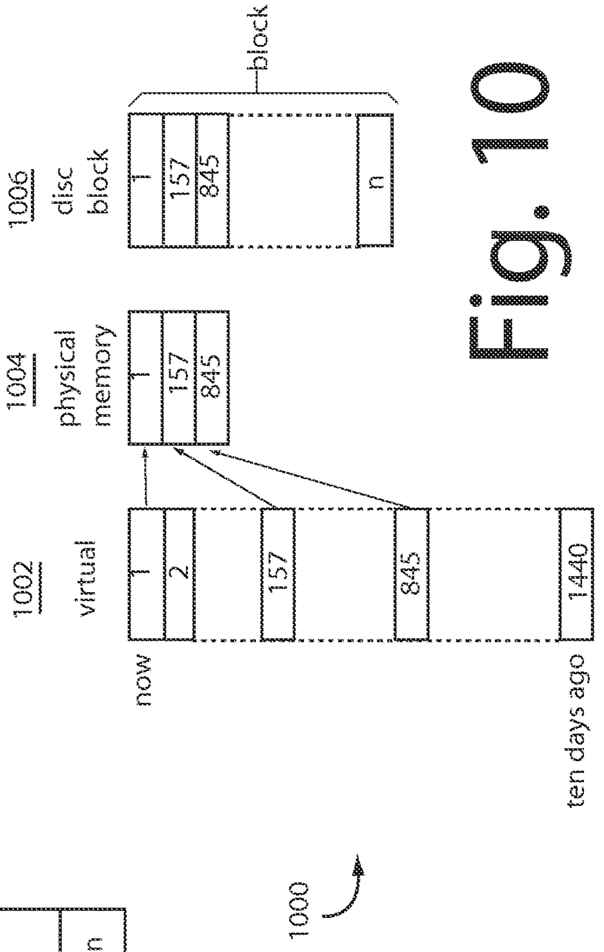
FIG. 10 is a diagram of a virtual addressing scheme used to access transactions in atomic time intervals by their smart agent profile vectors.

FIG. 10 illustrates a virtual memory system 1000 in which a virtual address representation 1002 is translated into a physical memory address 1004, and/or a disk block address 1006.

Profiling herein looks at events that occurred over a specific span of time. Any vectors that were assigned to events older than that are retired and made available for re-assignment to new events as they are added to the beginning of the list.

The following pseudo-code examples represent how smart agents (e.g., 412, 550) lookup profiles and make behavior deviation computations. A first step when a new transaction (e.g., 502) arrives is to find the one profile it should be directed to in the memory or filing system.

```
find_profile ( T: transaction, PT : Profile's Type )
Begin
    Extract the value from T for each key used in the routing logic for PT
    Combine the values from each key into PK
    Search for PK in the in-memory index
    If found, load the profile in the file of type PT based on the indexed
    position.
    Else, this is a new element without a profile of type PT yet.
End
```

If the profile is not a new one, then it can be updated, otherwise a new one has to be created.

```
update_profile ( T: transaction, PT : Profile's Type )
Begin
    find_profile of type PT P associated to T
    Deduce the timestamp t associated to T
    If P is empty, then add a new record based on the atomic interval for
    t
    Else locate the record to update based on t
        If there is no record associated to t yet,
        Then add a new record based on the atomic interval for t
    For each datapoint in the profile, update the record with the values in
    T (by increasing a count, sum, deducing a new minimum, maximum
```

-continued

```
    ...).
    Save the update to disk
End
compute_profile ( T: transaction, PT : Profile's Type )
Begin
    update_profile P of type PT with T
    Deduce the timestamp t associated to T
    For each datapoint DP in the profile,
        Initialize the counter C
        For each record R in the profile P
            If the timestamp t associated to R belongs to the span of time for
            DP
            Then update C with the value of DB in the record R (by
            increasing a count, sum,
                deducing a new minimum, maximum ...)
        End For
    End For
    Return the values for each counter C
End
compute_profile ( T: transaction, PT : Profile's Type )
Begin
    update_profile P of type PT with T
    Deduce the timestamp t associated to T
    For each datapoint DP in the profile,
        Initialize the counter C
        For each record R in the profile P
            If the timestamp t associated to R belongs to the span of time for
            DP
            Then update C with the value of DB in the record R (by
            increasing a count, sum,
                deducing a new minimum, maximum ...)
        End For
    End For
    Return the values for each counter C
End
```

The entity's behavior in the instant transaction is then analyzed to determine if the real-time (RT) behavior is out of the norm defined in the corresponding long-term (LT) profile. If a threshold (T) is exceeded, the transaction risk score is incremented.

```
analyze_entity_behavior ( T: transaction )
Begin
    Get the real-time profile RT by calling compute_profile( T,
    real-time )
    Get the long-term profile LT by calling compute_profile( T,
    long-term )
    Analyze the behavior of the entity by comparing its current behavior
    RT to its past behavior LT:
    For each datapoint DP in the profile,
        Compare the current value in RT to the one in LT (by computing
        the ratio or distance between the values).
            If the ratio or distance is greater than the pre-defined threshold,
            Then increase the risk associated to the transaction T
            Else decrease the risk associated to the transaction T
    End For
    Return the global risk associated to the transaction T
End
```

The entity's behavior in the instant transaction can further be analyzed to determine if its real-time (RT) behavior is out of the norm compared to its peer groups. defined in the corresponding long-term (LT) profile. If a threshold (T) is exceeded, the transaction risk score is incremented.

Recursive profiling compares the transaction (T) to the entity's peers one at a time.

```
compare_entity_to_peers ( T: transaction )
Begin
    Get the real-time profile RTe by calling compute_profile( T,
    real-time )
```

-continued

```
    Get the long-term profile LTe by calling compute__profile( T,
    long-term )
    Analyze the behavior of the entity by comparing it to its peer groups:
    For each peer group associated to the entity
      Get the real-time profile RTp of the peer: compute__profile( T,
      real-time )
      Get the long-term profile LTp of the peer: compute__profile( T,
      long-term )
      For each datapoint DP in the profile,
      Compare the current value in RTe and LTe to the ones in RTp and
      LTp (by computing the ratio or distance between the values).
        If the ratio or distance is greater than the pre-defined threshold,
        Then increase the risk associated to the transaction T
        Else decrease the risk associated to the transaction T
      End For
    End For
    Return the global risk associated to the transaction T
End
```

Each attribute inspection will either increase or decrease the associated overall transaction risk. For example, a transaction with a zipcode that is highly represented in the long term profile would reduce risk. A transaction amount in line with prior experiences would also be a reason to reduce risk. But an MCC datapoint that has never been seen before for this entity represents a high risk. (Unless it could be forecast or otherwise predicted.)

One or more datapoints in a transaction can be expanded with a velocity count of how-many or how-much of the corresponding attributes have occurred over at least one different span of time intervals. The velocity counts are included in a calculation of the transaction risk.

Transaction risk is calculated datapoint-by-datapoint and includes velocity count expansions. The datapoint values that exceed a normative point by a threshold value increment the transaction risk. Datapoint values that do not exceed the threshold value cause the transaction risk to be decremented. A positive or negative bias value can be added that effectively shifts the threshold values to sensitize or desensitize a particular datapoint for subsequent transactions related to the same entity. For example, when an airline expense is certain to be followed by a rental car or hotel expense in a far away city. The MCC's for rental car and hotel expenses are desensitized, as are datapoints for merchant locations in a corresponding far away city.

Figure 11:
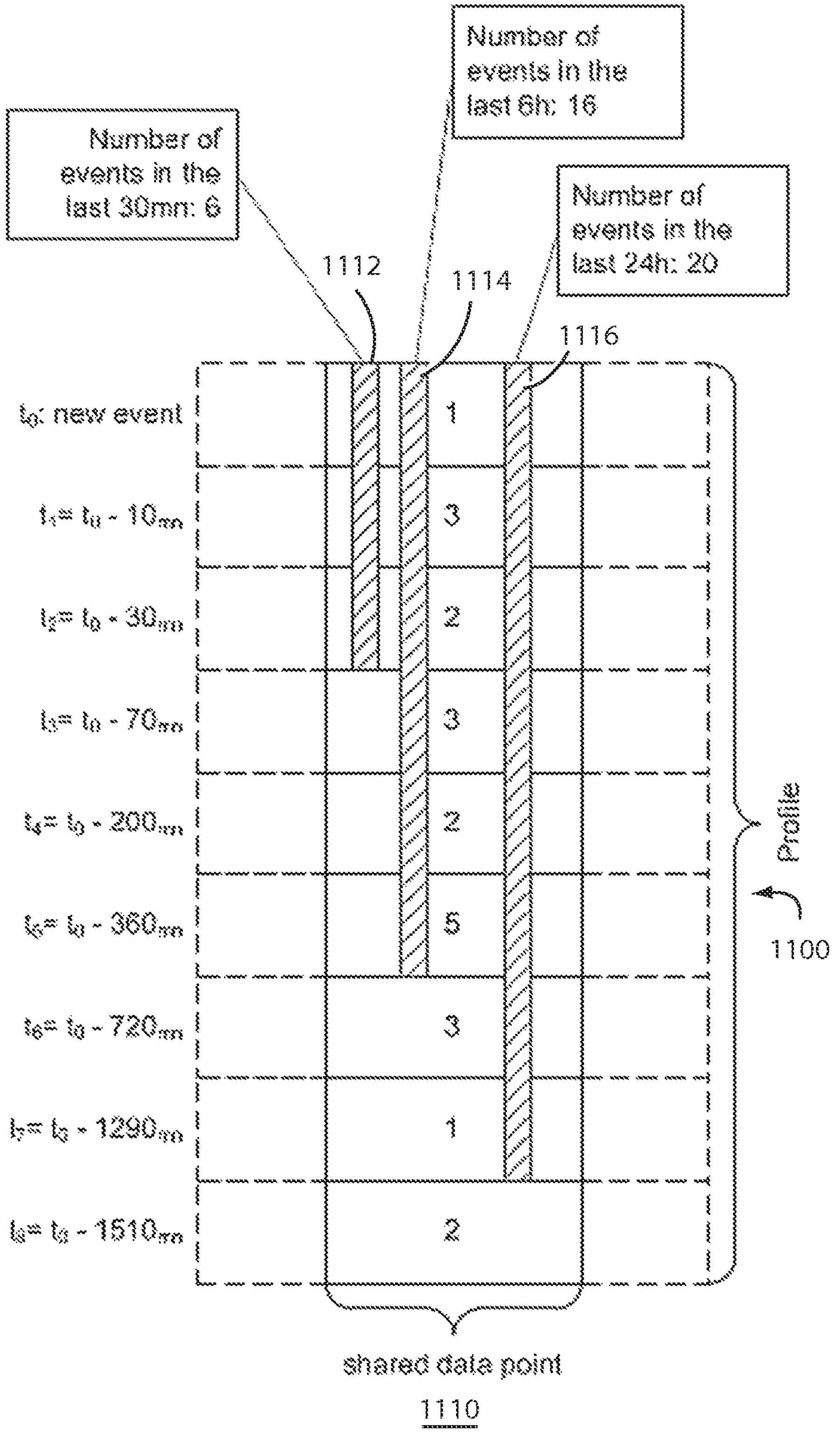
FIG. 11 is a diagram of a small part of an exemplary smart agent profile that spans several time intervals.

FIG. 11 illustrates an example of a profile 1100 that spans a number of time intervals $t_0$ $t_8$. Transactions, and therefore profiles normally have dozens of datapoints that either come directly from each transaction or that are computed from transactions for a single entity over a series of time intervals. A typical datapoint 1110 velocity counts the number of events that have occurred in the last thirty minutes (count 1112), the last six hours (count 1114), and the last twenty-four hours (count 1116). In this example, to had one event, $t_1$ had 3 events, $t_2$ had 2 events, $t_3$ had 3 events, $t_4$ had 2 events, $t_5$ had 5 events, $t_6$ had 3 events, $t_7$ had one event, and $t_8$ had 2 events; therefore, $t_2$ count 1112=6, to count 1114=16, and $t_7$ count 1116=20. These three counts, 1112-1116 provide their velocity count computations in a simple and quick-to-fetch summation.

Figure 12:
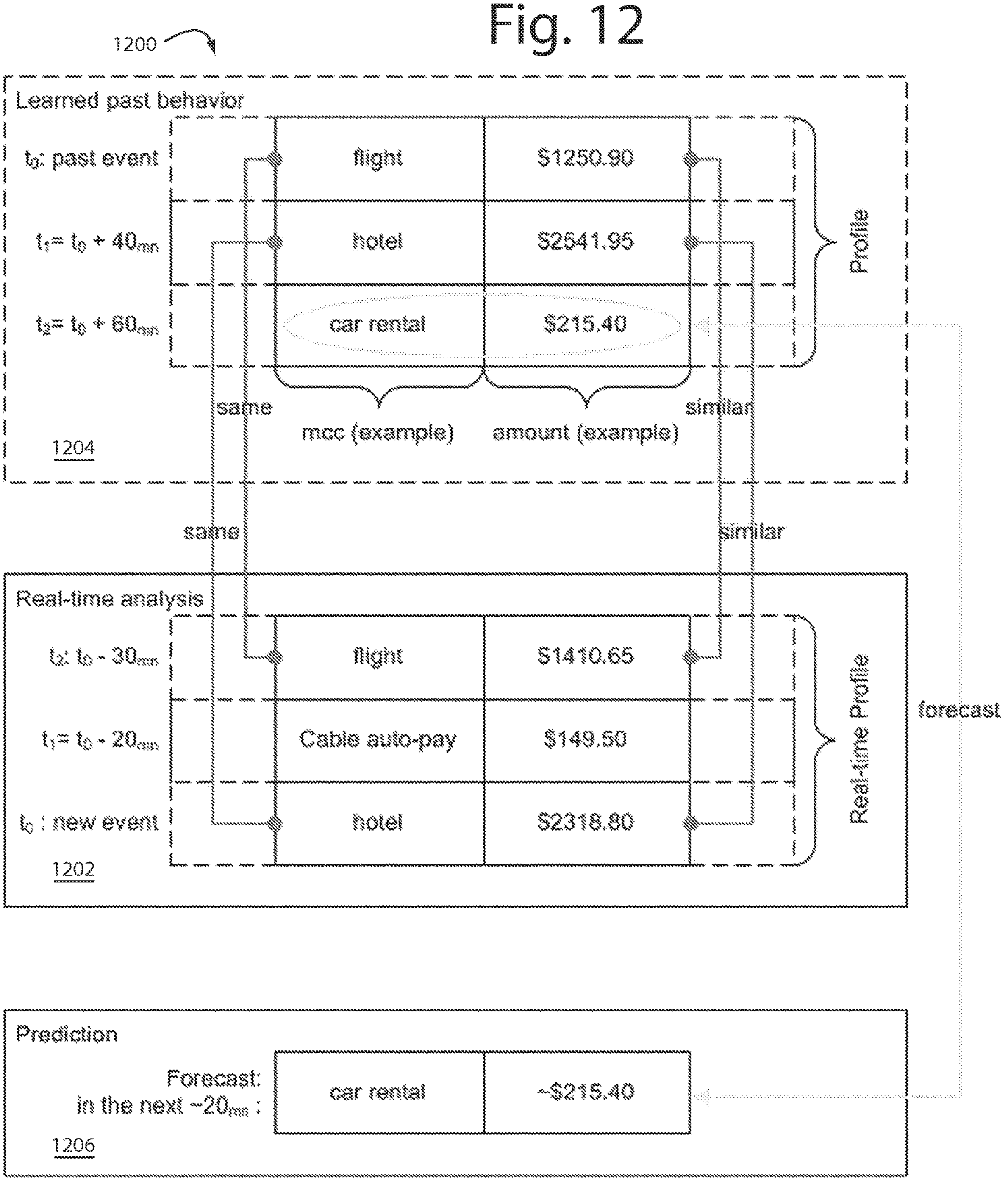
FIG. 12 is a diagram of a behavioral forecasting aspect of the present invention.

FIG. 12 illustrates a behavioral forecasting aspect of the present invention. A forecast model 1200 engages in a real-time analysis 1202, consults a learned past behavior 1204, and then makes a behavioral prediction 1206. For example, the real-time analysis 1202 includes a flight purchase for $1410.65, an auto pay for cable for $149.50, and a hotel for $2318.80 in a most recent event. It makes sense that the booking and payment for a flight would be concomitant with a hotel expense, both represent travel. Consulting the learned past behavior 1204 reveals that transactions for flights and hotels has also been accompanied by a car rental. So an easy forecast for a car rental in the near future is and easy and reasonable assumption to make in behavioral prediction 1206.

Normally, an out-of-character expense for a car rental would carry a certain base level of risk. But if it can be forecast one is coming, and it arrives, then the risk can reduced since it has been forecast and is expected. Embodiments of the present invention therefore temporarily reduce risk assessments in the future transactions whenever particular classes and categories of expenses can be predicted or forecast.

In another example, a transaction to pay tuition at a local college could be expected to result in related expenses. So forecasts for bookstore purchases and ATM cash withdrawals at the college are reasonable. The bottom-line is fewer false positives will result.

Figure 13:
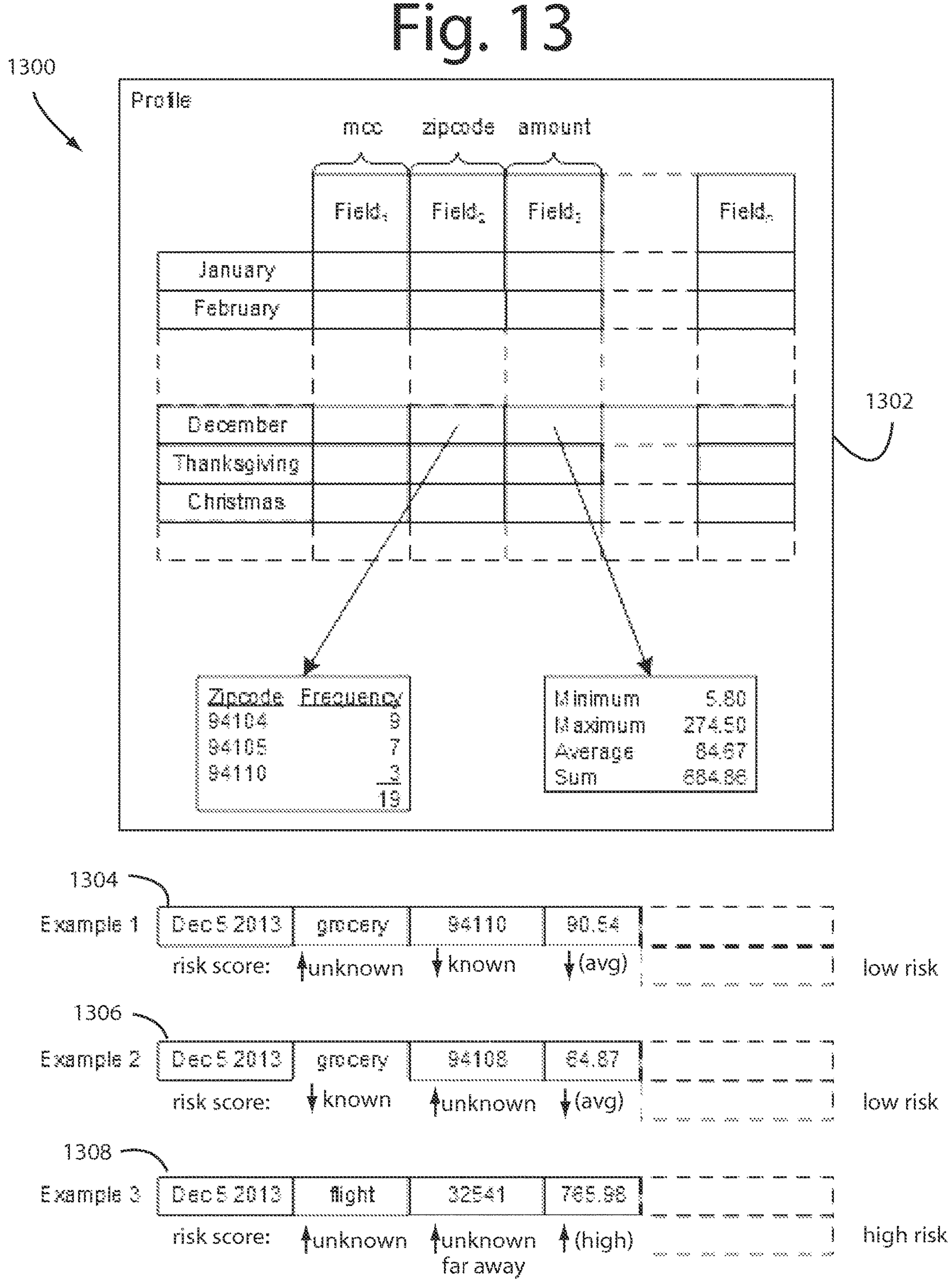
FIG. 13 is a diagram representing a simplified smart agent profile and how individual constituent datapoints are compared to running norms and are accumulated into an overall risk score.

FIG. 13 illustrates a forecasting example 1300. A smart agent profile 1302 has several datapoint fields, $field_1$ through $field_n$. Here we assume the first three datapoint fields are for the MCC, zipcode, and amount reported in a new transaction. Several transaction time intervals spanning the calendar year include the months of January . . . December, and the Thanksgiving and Christmas seasons. In forecasting example 1300 the occurrence of certain zip codes is nine for 94104, seven for 94105, and three for 94110. Transaction amounts range $5.80 to $274.50 with an average of $84.67 and a running total of $684.86.

A first transaction risk example 1304 is timestamped Dec. 5, 2013 and was for an unknown grocery store in a known zipcode and for the average amount. The risk score is thus plus, minus, minus for an overall low-risk.

A second transaction risk example 1306 is also timestamped Dec. 5, 2013 and was for a known grocery store in an unknown zipcode and for about the average amount. The risk score is thus minus, plus, minus for an overall low-risk.

A third transaction risk example 1306 is timestamped Dec. 5, 2013, and was for an airline flight in an unknown, far away zipcode and for almost three times the previous maximum amount. The risk score is thus triple plus for an overall high-risk. But before the transaction is flagged as suspicious or fraudulent, other datapoints can be scrutinized.

Each datapoint field can be given a different weight in the computation in an overall risk score.

In a forecasting embodiment of the present invention, each datapoint field can be loaded during an earlier time interval with a positive or negative bias to either sensitize or desensitize the category to transactions affecting particular datapoint fields in later time intervals. The bias can be permanent, temporary, or decaying to none.

For example, if a customer calls in and gives a heads up they are going to be traveling next month in France, then location datapoint fields that detect locations in France in next month's time intervals can be desensitized so that alone does not trigger a higher risk score. (And maybe a "declined" response.)

Some transactions alone herald other similar or related ones will follow in a time cluster, location cluster, and/or in an MCC category like travel, do-it-yourself, moving, and even maternity. Still other transactions that time cluster, location cluster, and/or share a category are likely to reoccur in the future. So a historical record can provide insights and comfort.

Figure 14:
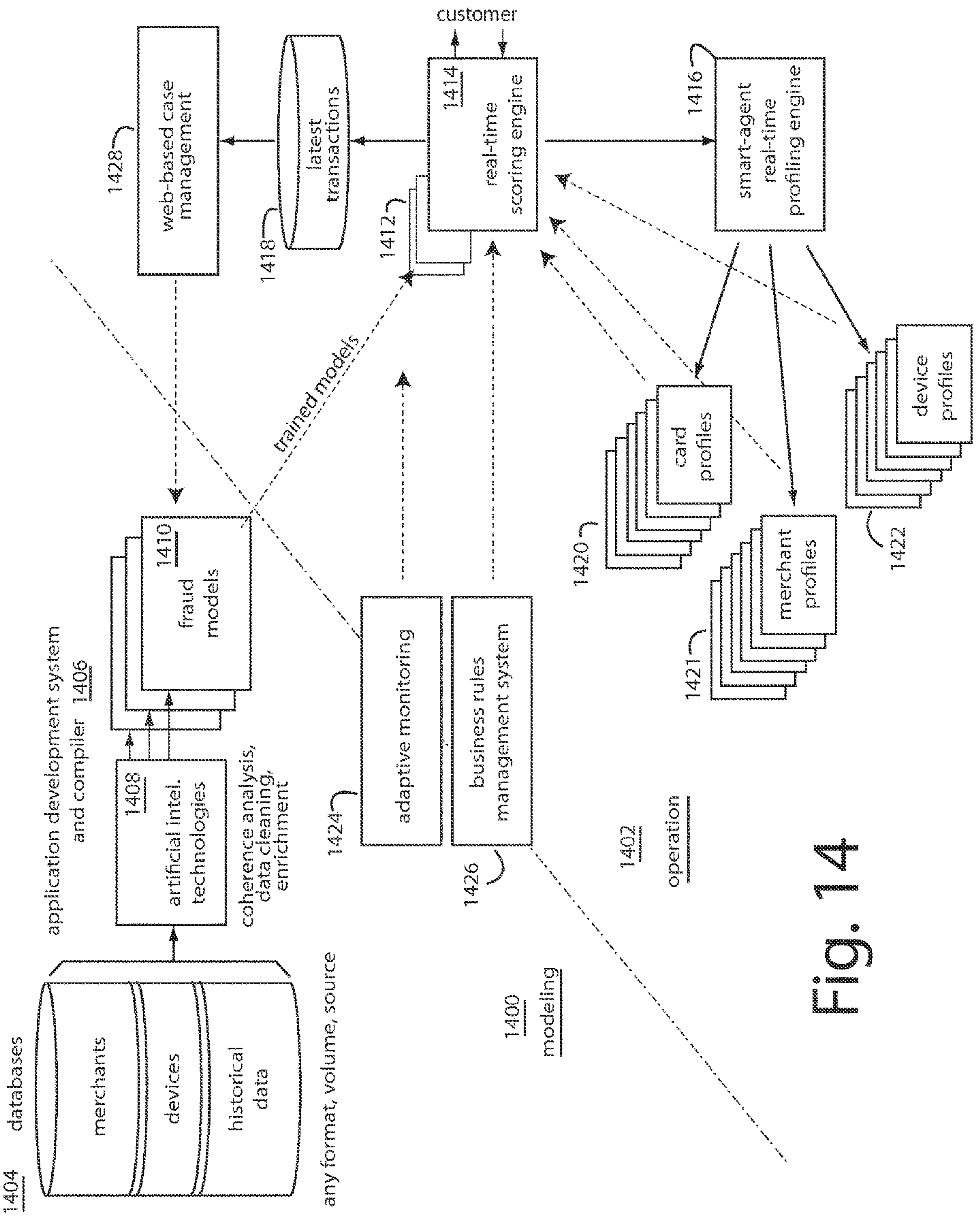
FIG. 14 is a functional block diagram of a modeling and operational environment in which an application development system is used initially to generate, launch, and run millions of smart agents and their profiles.

FIG. 14 represents the development, modeling, and operational aspects of a single-platform risk and compliance embodiment of the present invention that depends on millions of smart agents and their corresponding behavioral profiles. It represents an example of how user device identification (Device ID) and profiling is allied with accountholder profiling and merchant profiling to provide a three-dimensional examination of the behaviors in the penumbra of every transaction and authorization request. The development and modeling aspects are referred to herein by the general reference numeral 1400. The operational aspects are referred to herein by the general reference numeral 1402. In other words, compile-time and run-time.

The intended customers of embodiments of the present invention are financial institutions who suffer attempts by fraudsters at payment transaction fraud and need fully automated real-time protection. Such customers provide the full database dossiers 1404 that they keep on their authorized merchants, the user devices employed by their accountholders, and historical transaction data. Such data is required to be accommodated in any format, volume, or source by an application development system and compiler (ADSC) 1406. ADSC 1406 assists expert programmers to use a dozen artificial intelligence and classification technologies 1408 they incorporate into a variety of fraud models 1410. This process is more fully described in U.S. patent application Ser. No. 14/514,381, filed Oct. 15, 2014 and titled, ARTIFICIAL INTELLIGENCE FRAUD MANAGEMENT SOLUTION. Such is fully incorporated herein by reference.

One or more trained fraud models 1412 are delivered as a commercial product or service to a single platform risk and compliance server with a real-time scoring engine 1414 for real-time multi-layered risk management. In one perspective, trained models 1412 can be viewed as efficient and compact distillations of databases 1404, e.g., a 100:1 reduction. These distillations are easier to store, deploy, and afford.

During operation, real-time scoring engine 1414 provides device ID and clickstream analytics, real-time smart agent profiling, link analysis and peer comparison for merchant/internal fraud detection, real-time cross-channel fraud prevention, real-time data breach detection and identification device ID and clickstream profiling for network/device protection.

A real-time smart agent profiling engine 1416 receives behavioral digests of the latest transactions 1418 and uses them to update three populations of profiles 1420-1422. Specifically, a population of card profiles 1420, a population of merchant profiles 1421, and a population of device profiles 1422 all originally generated by ADSC 1406 and included in the trained models 1412. These are all randomly and individually consulted in real-time by smart agent profiling engine 1416 to understand what is “normal” for a particular card, merchant, and user device.

Real-time smart agent profiling engine 1416 accepts customer transaction data and scores each line. Such scores are in accordance with business rules provided by a business rules management system (BRMS) 1424 and any adaptive updates 1426 needed to the original set of models 1410 produced by artificial intelligence technologies and classifiers 1408. A web-based case management system 1428 uses false positives and false negatives to tighten up models 1410. These are periodically used to remotely update models 1412.

In general smart agent process embodiments of the present invention generate a population of smart agent profiles by data mining of historical transaction data. A corresponding number of entities responsible for each transaction are sorted and each are paired with a newly minted smart agent profile. Each smart agent profile so generated is modelled to collect and list individual and expanded attributes of said transactions in one column dimension and by time interval series in another row dimension. Each smart agent profile is stored in a file access system of a network server platform.

Each newly arriving transaction record is compared and contrasted attribute-by-attribute with the time interval series of attributes archived in its paired smart agent profile, and each such comparison and contrast incrementally increases or decreases a computed fraud risk score. The computed fraud risk score is thereafter output as a determination of whether the newly arriving transaction record represents a genuine transaction, a suspicious transaction, or a fraudulent transaction. Or maybe just OK-bad, or a fuzzy score between 0 . . . 1.

Each time interval series can be partitioned or divided in its row dimension into a real-time part and a long-term part to separately pre-compute from the real-time part and the long-term part a velocity count and statistics of said individual and expanded attributes. The newly arriving transaction record is then compared item-by-item to relevant items in each said real-time part and long-term part, and thereby determines if each item represents known behavior or unknown behavior.

Each newly arriving transaction record is inspected to see if the entity it represents has not yet been paired to a smart agent profile, and if not then generating and pairing a newly minted smart agent profile for it.

In another embodiment, three populations of smart agent profiles are generated by data mining the historical transaction data. A corresponding number of cardholder, merchant, and identified device entities involved in each transaction are sorted and each are paired with a newly minted smart agent profile. Then, each newly arriving transaction record is compared and contrasted attribute-by-attribute with the time interval series of attributes archived in the smart agent profiles paired with the particular cardholder, and with the particular merchant, and with the particular identified device (Device ID), and each such comparison and contrast incrementally increases or decreases a computed overall fraud risk score. See our U.S. patent application Ser. No. 14/517,863, filed 19 Oct. 2014, and titled User Device Profiling In Transaction Authentications, for details on the Device ID technology we have in mind here.

In general, commercial messaging embodiments of the present invention are implemented as a software-as-a-service (SaaS) applications on network servers. The clickstream behaviors of online consumers are collected in real-time while the consumers are online shopping or surfing. The clickstream behaviors are copied to the SaaS from the visited websites that subscribe to such service.

Figure 15:
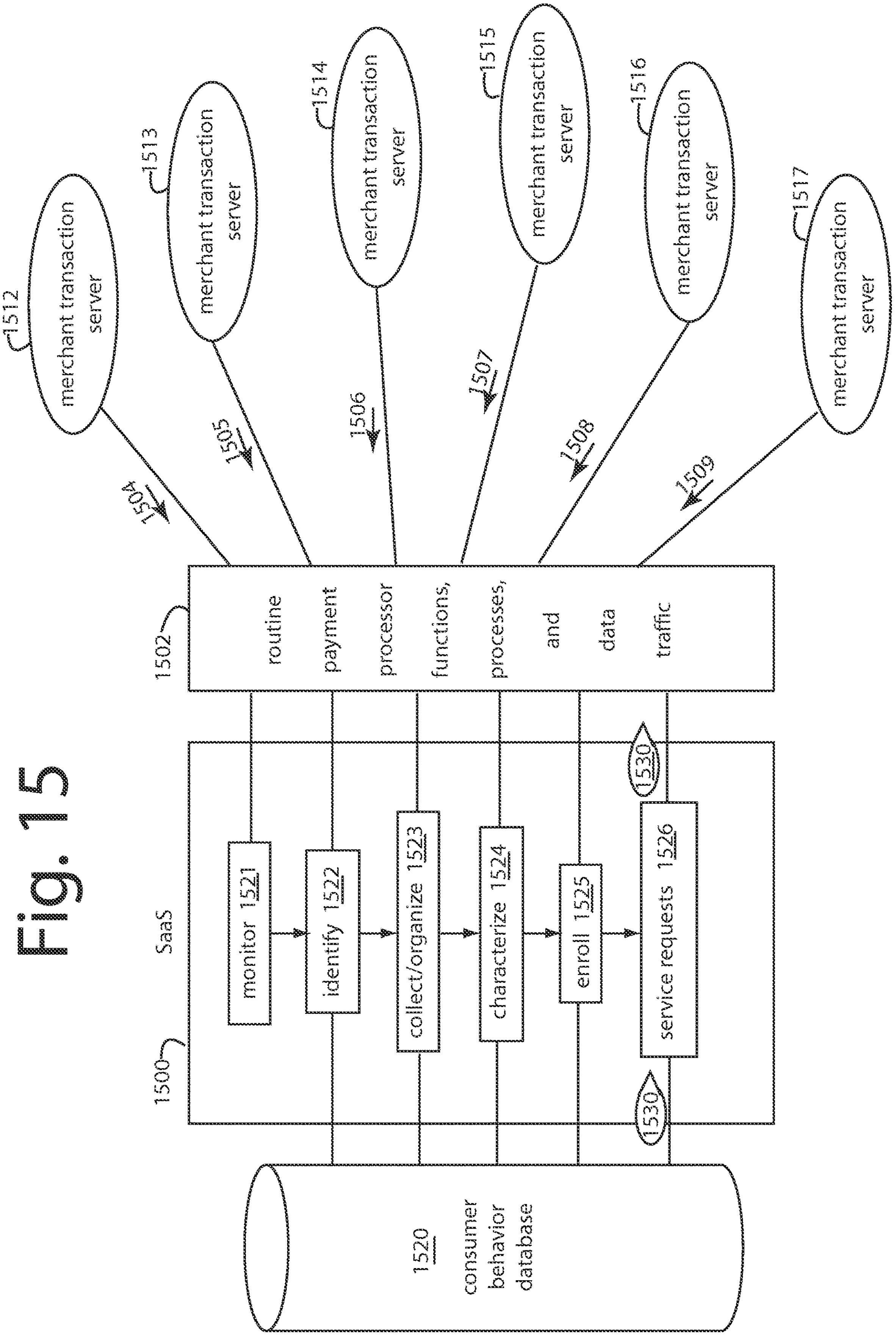
FIG. 15 is functional block diagram of a computer program product for centralized hosting of business applications as a software-as-a-service (SaaS) product installed on a payments processor.

Referring now to FIG. 15, a software-as-a-service (SaaS) 1500 is built to run as an application on a network server 1502. Clickstream behavior data 1504-1509 corresponds to numerous online consumers. The data are collected in real-time while the consumers are online shopping or surfing at a variety of independent and unrelated commercial websites. Each of these commercial websites has its own merchant transaction server 1512-1517 that is extended to accumulate and forward clickstream such behavior data. The clickstream behaviors 1504-1509 are copied to the SaaS 1500 from the visited websites that subscribe to such service.

The context for ads can be used to identify specific audiences. For example, an ad for a hotel can be offered for display if the user context is travel. However, an ad for wine is not appropriate on a website for recovering alcoholics, even though the ad and the content of the website are related to the context, albeit in a negative way. The context and the positive direction of the context is to be understood to make for an effective SaaS service.

A thesaurus-based contextual analysis can be used to filter the content. E.g., extracting the main idea of the content by determining the contexts in which words in the content are used. A thesaurus is built into word-context database and stored in database 1520.

Contextual analysis is used in embodiments of the present invention to evaluate the appropriateness of a particular site, so the main idea of the site's content can be extracted. The information extraction is a text process that locates a specific set of relevant items in the web page document.

Contextual analysis and concept extraction can automate a categorization and cross-referencing of information by using the thesaurus. By using contextual analysis, smart analytics processors can artificially "understand" the main idea of most documents and websites. Smart analytics assigns the highest importance to semantics and each word's context or main idea.

Smart analytical software is best installed on a central server to monitor the activities of a large population of users. The thesaurus database is loaded with an extensive list of words and an comprehensive list of contexts in which such words are typically used. The thesaurus database helps create a list of contexts for the relevant words visited in a document. When the document is an electronic webpage, included software follows any links displayed in the web page to further detail the contexts.

The smart analytical software assigns a "context pertinence value" to each context found in the document. The context pertinence value of a given context determines how many restricted words associated with that context are found in the document. The smart analytical software determines the most important contexts conveyed in the electronic document. Each word is assigned a weight that depends on how the word is displayed in the document. Each context is assigned a weight that depends on the number of words in the document that have the same context, the weight of those words, and the number of contexts for each one of those words. The contexts assigned the highest weight are determined to be the most important contexts. If the most important contexts are among the restricted contexts specified in the contexts database, the user is offered ads specific to that context.

As seen in FIG. 15, SaaS 1500 comprises software instruction sets 1521-1526 for enabling payments processor network server 1502 to additionally provide consumer preferences and forecasts, or even audience-appropriate commercial messages 1530 to what can be thousands of merchant transaction processors 1512-1517. For example, using the contextual analysis detailed herein.

Software instruction set 1521 monitors consumer purchase transaction and payment data independently communicated with individual merchant transaction servers and a payments processor server. Excerpts and abstracts of these are stored in a database 1520.

Software instruction set 1522 identifies individual consumers from many instances of consumer purchase transaction and payment data coming over time over many unrelated connections to independent merchant transaction servers. The identifications are stored in database 1520.

Software instruction set 1523 collects and organizes consumer purchase information derived from the transaction and payment data according to the consumer identities recognized. The organized collections are stored as dossiers in database 1520.

Software instruction set 1524 characterizes what is important to each identified consumer and forecasts what they are likely to buy from intimations obtainable from records of what they did buy, when they bought it, what was bought in combination, where it was bought, what the total purchases were, and any strong correlations to other available data. These conclusions, consumer preferences and forecasts 1510 are kept at-the-ready in database 1520.

Software instruction set 1525 enrolls individual ones of many merchant transaction servers connected to the payments processor server to access conclusions calculated as to what is important to each identified consumer and forecasts of what they are likely to buy. Those enrolled are maintained in database 1520.

Software instruction set 1526 enables payments processor server 1528 to service real-time requests by enrolled ones of the merchant transaction servers for the conclusions that have been calculated. In response, database 1520 supplies individual consumer preferences and forecasts 1510. The enrolled ones of the merchant transaction servers 1512-1517 are enabled by the conclusions to offer messages and incentives of interest to a correspondingly identified consumer at the time of their concluding another transaction with a merchant.

Device identifications that use behavioral data to advance over simple device ID techniques will outperform and provide better results and lowered losses due to fraud. Behaviorally enhanced device ID is therefore a critical part of all embodiments of the present invention. It recognizes individual users will use their tools in repeatable, recognizable ways no matter what devices they are using at the moment.

It is important for merchant companies to constantly evolve their systems to stay in tune with developing standards, rapid technological changes, and keep up with ever more sophisticated and capable fraudsters trying to break in and abuse their systems.

Very few single dimension device ID technologies are effective in being able to uniquely recognize devices when the legitimate devices themselves are changing daily. Multi-layer, multi-dimensional fraud device identification is required now in a world where ever-more clever thieves and surprising new malware behaviors pop up daily.

In general, multi-layer behavioral device identifications can be had by combining multi-agent technology with case-based reasoning, real-time profiling, and long-term profiling. Multi-layer behavioral device identifications can guarantee correct device identifications even when many changes and updates have occurred on the devices. Better device identifications mean e-commerce can be safer and more secure for everyone.

Smart-agents are used in the embodiments of the present invention to create a virtual agent for each user device. Each such virtual agent is configured to observe and learn the behavior of its host user device over time to create a device profile. The ways the user device is used, the frequency of its use, the types of actions taken, e.g., during the last minute, ten minutes, over days/weeks/years are all intelligently aggregated into a profile of what's normal for this user.

Figure 16:
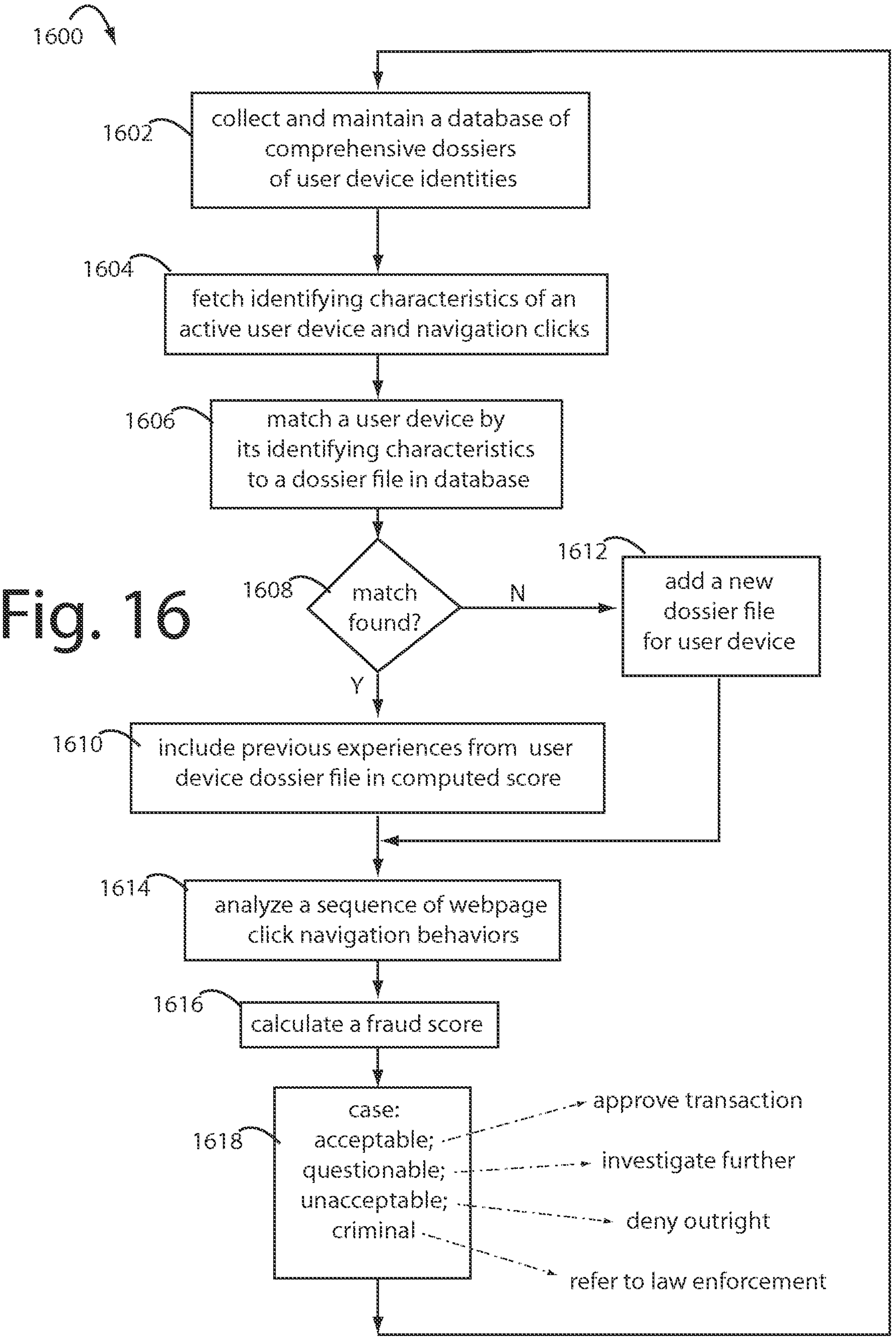
FIG. 16 is a flowchart diagram of a top level computer process useful in the SaaS product of FIG. 15.

FIG. 16 represents a network server method 1600 for protecting websites from fraudsters. Method 1600 includes a step 1602 for accumulating and maintaining a database of comprehensive dossiers of user device identities. These identifying characteristics are fetched in a step 1604 from activity reports about user-device visits to webpages as they are volunteered by the reporting websites. The assemblage and organization of user device identifying characteristics can be carried on over a period of time that can span months or even years. A step 1606 tries to match each newly presenting user device currently visiting a website by its identifying characteristics to a particular user device identity dossier already in the database 120.

If a match is found in a step 1608, any previous experiences with the particular user device by this or other included websites is included in a first part calculation of a fraud score. Such first part of the score is computed in a step 1610. Otherwise, a step 1612 builds and adds a new file to be inserted the database 120 for future use.

A step 1614 analyzes a sequence of webpage click navigation behaviors of each corresponding user device then being employed to visit a particular webpage and website. A real person with a real purpose will navigate around and between webpages in a particular way. Fraudsters and automated crawlers behave very differently. A step 1616 calculates a final or only part of the fraud score in real-time. A step 1618 is configured as an output which useful to assist each website in determining whether to allow a proposed transaction to be concluded by a particular user device. For example, a good score predetermined to be acceptable would trigger an approval of a user transaction. A marginal score could be used to signal a call should be made, or investigated further. A poor score would issue an outright denial. A red-flag score could be used to alert law enforcement. Whenever a particular user device cannot be matched to any particular dossier file in the database, a new dossier file is opened up for such user device according to the user device identification parameters then obtained. The determination of a fraud score is necessarily limited to what can be surmised by analyzing the sequences of webpage click navigation behaviors that occurred. This limitation is reflected in the fraud score.

An endpoint client can be embedded in a webpage presented on a website and configured to provoke a browser in a user device to report back user device information, capabilities, extensions, add-ons, configurations, user device locations, and other data which are useful to sort through and contribute to corresponding user device dossier files maintained in the database 120. For example, FLASH PLAYER video, ACTIVEX, and JAVASCRIPT objects embedded in webpages all naturally provoke a lot of useful identifying and characterizing information to be reported back from plug-ins and extensions already present each user device.

For example, JavaScript can be used to check various non-universal physical attributes of a particular user device, including its operating system, CPU architecture, video card, screen size, and other items that fluctuate widely in the real-world population. The data that can usually be obtained by JavaScript includes, user agent, Screen resolution, user language, time zone offset, graphics processing unit (GPU) information, list of specific fonts availability, list of plugins, list of MimeTypes, availability of cookies, availability of HTML5 properties and methods, attributes specific to the browser, etc.

If an innocuously small Flash video is included in the webpages, its normal protocols can be appropriated to provide extra information made available to the Flash player, e.g., information describing audio/video codecs, printers, touchscreens, and other peripherals. The physical location of a user device can be discerned from its IP address using a geo-location database to get the city, latitude, and longitude. Overall, two hundred fields can be gathered together and used to identify a single user device with high degree confidence.

A mobile endpoint client is similar to the endpoint clients used for personal computers. It may not always be possible to gather identifying user device information with a browser. So mobile endpoint clients are constructed from small libraries of Java (for Android) or Objective C (for iOS) and included in a downloadable app. Once installed, the app is empowered to request a device ID from the mobile client. It is configured to gather user device information in the background and send it to server 128 for recognition and identification.

An unnoticeable web browser is launched in the background to gather data from various browser-specific fields. Running now as an application, all the system calls become available. These system calls can be used to retrieve the peculiar mobile user device's physical properties, e.g., the iOS/Android version, the size and resolution of the screen, the capabilities of the touchscreen, etc. The user's settings can also be accessed, as well as a list of all the apps then installed on this particular user device. All this information is useful in database 120 to characterize and distinguish the particular user device 120-122 from a million others.

Using IP addresses for geo-location is not entirely satisfactory, these can vary as a user moves around from one cell tower to the next or between WiFi routers. It's better to use the built-in GPS app if available. Most smartphones now include these in their standard kit.

A centralizing of the collecting and maintaining of a database of comprehensive dossiers of user device ID's allows for a much larger population to be obtained from countless user-device visits to numerous webpages maintained by many unrelated websites. The otherwise independent and unrelated websites each forward user device activity reports in real-time as they occur to a single centralized server 1528 that solely controls and maintains database 1520. Fraud scores are reported back to the corresponding websites, e.g., over the Internet. Such service can be by paid subscription. Embodiments of the present invention would be useful in commercial payment systems, peer-to-peer money transactions, physical access controls to buildings and other facilities, communication-command-control applications, and in sensitive document control.

In general, embodiments of the present invention protect websites from fraudsters by analyzing webpage click navigation behaviors each of device visiting their webpages, and by collecting and maintaining comprehensive dossiers of device ID's, and by producing a fraud score in real-time to assist the website in deciding whether to allow a proposed transaction to be concluded.

Figure 17:
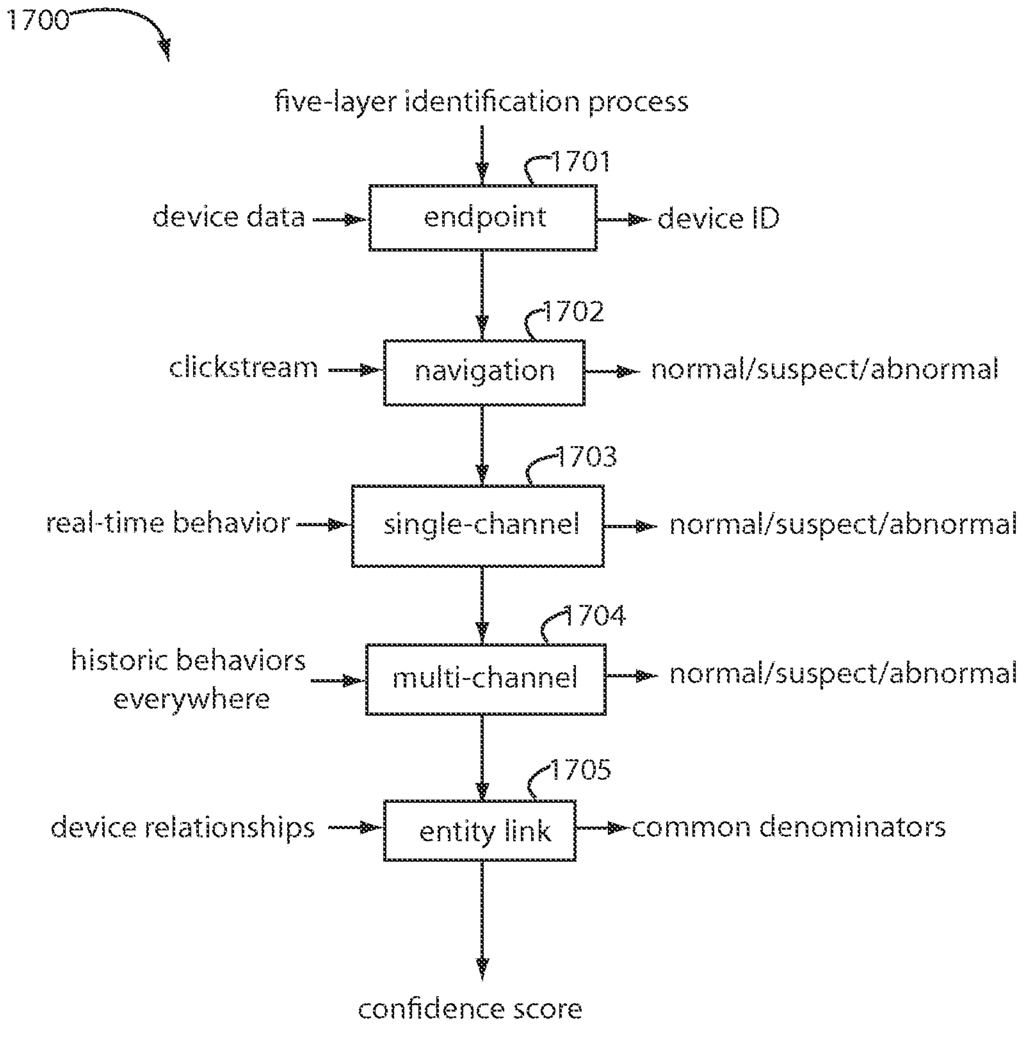
FIG. 17 is a flowchart diagram of how user devices can be accurately categorized by a five-layer identification process that includes endpoint, navigation, single-channel, multi-channel, and entity link analyses.

FIG. 17 represents how user devices can be accurately classified and categorized by a five-layer identification process 1700 that includes endpoint 1701, navigation 1702, single-channel 1703, multi-channel 1704, and entity link 1705 analyses. The first classification layer 1701 is endpoint-centric, it identifies users by their behaviors and by the attribute signatures of their particular devices. Such attribute signatures can be extracted by their browsers and the information obtained used in the identification.

An endpoint client is embedded in a web page provided by a website server so it can be carried back to the user device by its browser and run in background to gather data. When the data collection is completed, the endpoint client automatically delivers the collected data up to the website server for immediate use in identifying this user device.

Smart-agent technology, data-mining, a decision tree, and case-based reasoning are all used to find candidate matches in a large, server-side database. Such will either find a matching device or the collected data will be used to create a new device dossier. If the user device was recognized, the data fields in its dossier are updated as needed.

Mobile devices have a variety of ID's built-in, some incidentally and others unintended. For example, the Android ID is randomly generated and will persist across phone resets. The SIM cards used universally by mobile providers in their phones provide unique identifiers, but these cards can be freely removed and plugged into another phone by any user. There are other inherent ID's that are less reliable for our purposes, but these nevertheless can be helpful to build confidence.

The navigation-centric layer is the second layer mentioned. It is used to track session activities and do a clickstream analysis in real-time. The user's clickstream behaviors are compared to previously observed patterns of normal, suspect, abnormal, and malware attack activities for this particular user and the population in general. Smart-Agents are used in these categorizations.

Clickstreams are the navigation pathways users follow through web pages and can be tracked by the webpage servers. The order of the pages a user views can be and which pages they visit can be quite telling and uncover their true motivations in the visit. An important conclusion can be made as to whether this is a real customer legitimately engaged in shopping or a fraudster bouncing around looking for a point of entry. Once the current user has been identified, a record of their navigation clicks is constructed and used in a behavior study to build a confidence score.

One way to follow a user's path through a web site is to look first at the Referrer header for each page, e.g., to see where they came from. It can be informative to know if they arrived here from a search engine, from a competitor, from another one of the server's pages, or if they just typed the URL straight into their browser.

A "site depth" is assigned to each web page to represent how far or how many clicks away it is from the home page. These statistics can be used to see if the visitor is convincingly browsing around and up/down a product tree like a real user would.

Velocity counters track how fast a visitor is moving around in several dimensions, such as their reputed location, times of day, clickstreams, items added to carts, number and length of browsing sessions, click rates and quantities, category changes, reviews read, etc. For example, if a review is read for a product before buying it. Another important visitor attribute to recognize is the number of category changes they make as they navigate. Typical users usually have a single product goal in mind, they don't bounce randomly between categories nor shop for two or more items simultaneously.

Suspicious browsing patterns are often generated by automated site-crawling scripts. Long-term profiling counters are useful to track the number of different products users have viewed or purchased in each category. The average prices and numbers of items per order are also useful points to remember. Big ticket buyers don't randomly drop from the sky unannounced. Tracking what cities and countries a user logs in from, and what local times of day they have been active can be used to distinguish legitimate users. A lot of fraud is generated from Eastern Europe, Asia, and Africa, and so those sources deserve extra scrutiny and wariness.

Any new behavior raises a red-flag and can be used to match the historical actions on file. If a legitimate user were to leave their account logged in and a stranger sat down, or if an account is stolen with fraud or malware, the new behavior outside historical actions would be an early warning of fraud.

The third layer, is account-centric for a specific channel, such as online sales. It monitors transactions, creates profiles associated with each user device and analyzes real-time behavior. A combination of technologies are employed, e.g., smart-agent, real-time profiling, geo-profiling, recursive profiling, long-term profiling, neural networks, data mining, data quality engine, fuzzy logic, business rules, and case-based reasoning.

The fourth layer is device-centric, with behavioral perspectives taken across multiple channels of user device contact with independent merchant servers. The device-centric layer correlates alerts and activities for each device/user obtained from more than one channel.

Layer five includes entity link analysis, it searches for relationships among the devices they encounter and the channels they employ. The entity link analysis layer inspects users and machines in an effort designed to detect organized criminal activities and misuse. For example, all devices of a device or type should be or could expected to be similarly affected by WINDOWS, ANDROID, or iOS system updates, patches, and new versions that occur in public and more or less around the same time. These broad transformations in the population can be used in the scoring of changes as normal/abnormal when identifying a particular user device.

Each of the five layers 1701-1705 can by implemented with Smart-Agents that interact and negotiate with each other in order to reach their individual and collective goals. Algorithmic systems are very different and produce less reliable results in fraud risk assessments. Smart-Agents determine how to find a solution by providing each agent with goal information, e.g., situations that are desirable or undesirable.

Smart-Agents solve problems without needing extensive programming or sets of specific rules to be predefined that make for inflexibilities common to neural networks and genetic programming. Smart-Agents are able to effectuate runtime changes and adapt as needed.

Algorithmic programs follow successive operations applied in a fixed order. Algorithms enable computers to repeat long suites of logical operations tirelessly and accurately, which is great if the algorithm is fundamentally correct. Algorithmic programs are not equipped to take any initiative, and cannot stray even a little bit from each fixed line of code. It falls on the programmer to dictate, and spell out a precise succession of acts that the machine should follow. Often, there are just too many variables to code and too many decisions that can each be wrong. Business problems requiring even a minimum amount of reasoning are impossible to transcribe into algorithmic forms. Business decisions often require complex integration efforts involving large numbers of dynamic variables. And, having an algorithm available doesn't guarantee its practicality. Modest complexities can make it unwieldy.

Neural networks are not much better, they need to be trained, and many samples are needed in order to have a satisfactory result. Object-oriented languages require one to foresee, know, and program all the possible methods.

Smart-Agents can get past algorithmic limitations, and it is possible to design applications for them even when a suitable algorithm is unknown. Smart-Agents can adapt as the data they process changes. Each Smart-Agent is instructed to recognize information that favors the goals and is therefore "good", and information that disfavors the goals and is therefore "bad". Such instructions enable each Smart-Agent to automatically and autonomously make the "right" decision. This right-decision is referred to as the "THEN STATEMENT", as in a classic IF-THEN programming statement. An optimum THEN STATEMENT is relatively easy for a programmer to coin and get right.

The intelligence in the program springs from what the programmer embeds in each THEN STATEMENT. Smart-Agents can exist in a community of agents collected together to share a particular expertise, mimicking human society as they do. Smart-Agents can simulate human reasoning. Each Smart-Agent is able to operate independently according to its assigned functions, goals, representations of their environments, their runtime observations, acquired knowledge and interactions with other Smart-Agents. Systems of Smart-Agents marshal together many autonomous agents to interact and negotiate with one another.

An application's overall solution builds from the interactions as each Smart-Agent moves toward their respective goals.

Collections of Smart-Agents will appear to interact and negotiate to resolve complex and unpredictable problems, without any procedural programming or definition of rules. Each Smart-Agent is independent of the others, since each one of them only affects the others by the fact that they are in favor or disfavor of a specific goal. Smart-Agents are reusable in other applications.

Goal-satisfaction mechanisms direct Smart-Agents to accept or reject one incoming message over another. Every message is evaluated in terms of its being in favor of, in disfavor with, or neutral to reaching of a goal. For example, a private goal, a sending agent's goal, an organization's goal, or a system's goal. The Smart-Agents depend on each goal's opinion with respect to the current situation, the goal justifies the means. Smart-Agents can refuse messages, because they can charge messages as being favorable, unfavorable or neutral.

A bottom-line in fraud prevention systems is to decide how a particular transaction should be categorized. Every transaction is accepted by either a bad (fraud) agent or a good (normal) agent.

Other technologies can be usefully combined with Smart-Agents to produce even better results. Neural networks are a kind of algorithmic system that can interpret historical data and help identify trends and patterns against which to compare subject cases. Neural networks have the remarkable ability to solve problems related to detecting trends and patterns that humans or other computer techniques are unable to solve.

An Artificial Neural Network (ANN) models the ways in which biological nervous systems process information. The brain, e.g., consists of billions of processors, which process a large number of tasks concurrently. Neurons work collaboratively to solve the defined problem. Neural networks can resemble human reasoning, making them well suited to solve pattern recognition and forecasting problems.

ANN's have two primary parts, neurons, represented by neural units; and, synapses, connections between the neurons, which send signals from neuron to neuron. Those synapses can be excited (positive weight), or inhibited (negative weight). Most known neural networks have input layers for the agent to receive data from the environment, and output layers for the agent's potential actions. Others (like Back Propagation) have one or more intermediate layers between these two layers. These layers are massively interconnected, as the units on one layer are connected to those in the next layer. Just like the factors that shape a human, the factors that shape a neural network are its environment and its genetic makeup. Both its initial state and its training play a role in the ANN's development. It is through the critical training process that ANN's are taught how to arrive at the correct answer. A well-trained neural network will be more successful than a poorly trained neural network. The training refers to its environment and the experiences and samples that help shape it. The more samples and experience a neural network receives has a direct correlation with its likelihood of its success.

Case-based reasoning (CBR) can use past experiences or cases to solve new problems. Each "case" is translated into a list of steps to lead to a desirable outcome. The cases are stored and organized in a database, and used as an index for similar situations later. Solutions to complex problems can be found very quickly and accurately this way.

Being able to retrieve and manipulate past problem-solving examples accurately is important. Case-based systems search their case memories for an existing cases that match the input "specifications". As new cases are solved, the solutions are added to the case memory. Such will continue to grow the database of cases solved and increase the likelihood of success.

The goal is to find a case that matches the input problem and that proceeds directly to a solution. Thus making it possible to provide solutions to potentially complex problems quickly. If, on the other hand, an exact match cannot be found, the case-based system look for a similar one to the input situation, and then offer it as a potential solution.

How the system learns is when a nonperfect match is found that nevertheless solves the problem, the case is added to the systems case memory for future use. Each case is a recipe of steps that will lead to a particular outcome. A case is a connected set of subcases that form the problem-solving task's structure.

One of the key differences between rule-based and case-based knowledge engineering is that automatic case-indexing techniques drastically reduce the need to extract and structure specific rule-like knowledge from an expert. CBR systems retrieve relevant cases quickly and accurately from its memory. When a case should be selected for retrieval in similar future situations is the goal of case-indexing processes. As cases accumulate, case generalizations can be used to define prototypical cases that can be stored with the specific cases, improving the accuracy of the system in the long run.

The inductive-indexing capabilities in CBR systems provide several major advantages over neural networks and pattern-recognition techniques. Inductive systems can represent and learn from a wider range of feature types than either neural networks or pattern recognition. The ability to use richer feature sets for describing examples makes them at least as accurate and many time more precise. Case-Based Reasoning solves complex problems like planning, scheduling, and design by finding a similar, successful past plan, schedule, or design, and modifying it to meet the current problem's needs.

Another technology that can be added in a combinational approach is Fuzzy Logic. Fuzzy logic is able to account for areas that are not clearly defined. The logic can be extended to handle partial truths in situations where the answer lies somewhere in between what is true and what is false. Many of the big problems in organizations cannot be solved by simple yes/no or black/white programming answers. Sometimes answers come in shades of gray, where fuzzy logic proves useful. Fuzzy logic handles imprecision or uncertainty by attaching various measures of credibility to propositions. Fuzzy technology enables clear definition of problems where imperfect or partial knowledge exists, such as when the goal is "about 12 years old" or between "all" and "nothing". Traditional and classical logic typically categorize information into binary patterns such as: black/white, yes/no, true/false, or day/night.

The power of fuzzy logic is exponential when it is combined with other technologies like genetic algorithms, neural networks, and business rules. Many of the big problems in organizations cannot be solved by simple yes/no or black/white programming answers. Sometimes answers come in shades of gray, this is where fuzzy logic proves useful. Fuzzy logic handles imprecision or uncertainty by attaching various measures of credibility to propositions.

Genetic algorithms are able to address complicated problems with many variables and a large number of possible outcomes, by simulating the evolutionary process of "survival of the fittest" to reach a defined goal. They operate by generating many random answers to a problem, eliminating the worst and cross-pollinating the better answers. Repeating this elimination and regeneration process gradually improves the quality of the answers to an optimal or near-optimal condition. In computing terms, a genetic algorithm is a population of individuals represented by chromosomes, a set of character strings.

Genetic algorithms include three stages: building and maintaining a population of solutions to a problem, choosing the better solutions for recombination with each other, and using their offspring to replace poorer solutions. Each stage produces a new generation of possible solutions for a given problem.

In the first stage, an initial population of potential solutions is created as a starting point for the search process, each element of the population is encoded into a string (the chromosome), to be manipulated by the genetic operators. In the next stage, the performance (or fitness) of each individual of the population is evaluated with respect to the constraints imposed by the problem. Each individual of a population represents a possible solution to a given problem. Each individual is assigned a "fitness score" according to how good a solution to the problem it is. A potential solution to a problem may be represented as a set of parameters.

Business Rules, or Expert Systems are the most widely used commercial applications developed using artificial intelligence (AI). Many use expert systems to solve business problems. Expert systems model information at a higher level of abstraction. When these systems are implemented well they closely resemble human logic and become more reliable and easier to maintain. The goal is for the expert system to apply heuristic knowledge to give advice or make recommendations just like a human expert. Rules are used to represent a rule-of-thumb to specify a group of actions performed for a given situation. Rules are composed of if-then statements that comprise the necessary solution. An inference engine automatically matches facts against patterns and automatically determines which rules are applicable. This process of selecting rules against historical patterns will continue to repeat itself until no applicable rules remain. It is critical that the knowledge source is reliable, because the system is only as good the knowledge assimilated into the rules. One of the most difficult tasks in developing an expert system is extracting the knowledge from an expert so the rules can be written. The most widely known algorithms for compiling rules are RETE and TREAT.

Data mining, or knowledge discovery, in databases is the nontrivial extraction of implicit, previously unknown and potentially useful information from data. It is the search for relationships and global patterns that exist in large databases but are hidden among the vast amount of data. Using particular classifications, association rules and analyzing sequences; data is extracted, analyzed and presented graphically. Data mining, or knowledge discovery in databases is the nontrivial extraction of implicit, previously unknown and potentially useful information from data. It is the search for relationships and global patterns that exist in large databases but are hidden among the vast amount of data. Using particular classifications, association rules and analyzing sequences, data is extracted, analyzed and presented graphically.

Data mining algorithms always requires a number of different technical approaches to address data cleaning, sampling, clustering, learning classification rules, analyzing changes and detecting anomalies.

Descriptive Statistics is the process of obtaining meaningful information from sets of numbers that are often too large to deal with directly. While it is often impossible to calculate scores for all models when searching a large model space, it is often feasible to describe and calculate scores for a few equivalent classes of models receiving the highest scores. Prediction methods for this sort of problem always assume some regularity in the probability distribution.

Real-time profiling keeps track of activities over windows time spanning seconds, minutes, hours, days, months or even years. These profiles can highlight suspicious changes in device activities, by looking at the number of transactions from a device over a window of time, histories of payment methods, typical purchasing from the device, patterns and clickstreams of the device at the merchant's site, e-mail address activity from the device, ship-to and bill-to activity, etc.

Modern inventory control and retail checkout systems are capable of producing a lot of statistics about purchase behaviors of single individuals on a single visit and group behaviors over an hour, day, week, month, etc. These statistics can provide important insights into what consumers buy, what they buy in combination, and any correlations to time of day, day of week, month or year. They can also provide statistics on how a particular transaction fits within a larger group of transactions.

The place of purchase will be inherent in the statistics that can be collected. People tend not to venture very far from home or world and a retail merchant offering incentives would do well to offer their incentives in the neighborhoods where the targeted consumers are active. The widespread use of credit cards, payment cards, loyalty cards, and personal mobile devices allows a payments processor to tie seemingly unrelated purchase transactions together by the behavior of the consumer and even the device ID information obtainable rom their browsings and log ons.

For example, payments transaction records can show where a particular consumer has been shopping and when they most frequently shop, and what they shop for, e.g., groceries, gasoline, clothes, cars, etc. Patterns will often emerge that can be analyzed to forecast when and where the next shopping trip will be and what for. An enrolled merchant can benefit from the SaaS product services described herein by being able to send the consumer a coupon or message that the consumer would find of interest and timely.

Smart analytics embodiments of the present invention analyze consumer transaction data to help merchants deliver productive messages to their customers and prospects according to their particular, life stages, interests, geography, spending patterns, seasonal, culture, and other differentiating characteristics that can influence what they buy.

FIG. 15 illustrates a payment processor 1502 and Internet web portal connected to service routine transactions coming from thousands of merchants and millions of shoppers. A software-as-a-service (SaaS) 1500 is used to augment and enhance the consumer transaction services, it is used to sign up merchants. SaaS 1500 controls what features these merchants will have access to. For example, the merchants access the portal to collect insights into their customers' motivations and identify potential new customers from database 1520. A principal goal is to help merchant computers artificially "understand" their customers as non-homogenous individuals. This enables the merchants to make smarter decision about customer needs and future behaviors to proactively formulate attractive and personalized commercial offers.

SaaS 1500 helps merchants identify where their best customers will spend their money, and then assist in directing their efforts accordingly.

Given the perspective SaaS 1500 would have in servicing thousands of independent merchants, it could effectively provide useful peer view analyses. E.g., to provide marketing awareness and assistance for comparable merchants within a local geographic area.

As each consumer user shops in real-time and adds to their shopping carts it becomes possible to execute a Market Basket Analysis to spot further revenue optimization opportunities. For example, Up-sell and cross-sell offers by creating a group of items often bought together, e.g., bagels, cream cheese, cumber, onion, smoked salmon, and capers. Or things bought sequentially over days or weeks, e.g., engagement ring, wedding ring, wedding arrangements, honeymoon vacation spots. Loyalty programs can be based on advanced association methods. Such as to reward new and loyal customer with offers that they want and will redeem at the point-of-sale in real-time.

The spending habits of customers can be followed in each individual store, across a chain, and the user specific advertisement data can then be customized and adjusted based on user profiles and/or the current clickstreams.

Horizontal/Vertical Browsing

Real-time coupon redemption can be offered at the point of interaction. Offers can be limited to those with a short distance to the point-of-service. Clickstream analysis for Card Not Present transaction can help to understand how online shoppers navigate through a web site. The information can be used to customize and adjust user-specific advertisement data. Recommendation can be made by SaaS 100 on how to best optimize the merchant websites' workflows.

SaaS 1500 can help with Inventory Management/Supply Chain disruptions. E.g., to eliminate the expense of stockouts and overstocks. Weather, season, weekend, before and after taxes, events, etc., can all play a role that are predictable by analyzing user behaviors. SaaS 100 is useful in Store Operation and Store Organizations to monitor: Product, Placement, Pricing and Promotion and to understand how they impact volume growth or decline within a brand or category. Seasonal Product Placement requires putting the right product in the right place at the right price at the right time.

Conventional marketing strategies can therefore be applied in very practical ways with very affordable computer tools and systems. For example using, demographic baskets (clustering, family), competitor stores, comparative store sales, front store sales, inventory turnover, labor cost analysis register usage analysis, cross-selling, location-based marketing, in-store behavior analysis, customer micro-segmentation, leverage, if available, data in social media to drive effective promotions, collaborative filtering to generate "you might also want" prompts for each product bought or visited, behavioral device identification for security, and offers based on behavioral device activities and shopping patterns of a specific device.

Individual words collected in the clickstreams flowing back to SaaS 1500 can often be highly ambiguous, and specific meanings for them need to calculated. This can be done by a computer by analyzing the contexts in which the words exist. Context vectors and weights are assigned by the computer to artificially resolve word ambiguities. The points of interest for the consumer are revealed, and are used as a template to screen through appropriate commercial messages given the individual consumers' apparent shopping interests.

A diverse kit of commercial messages are sold to and subscribed by a wide variety of commercial producers of products and services. These commercial producers will pay a premium for SaaS services that can effectively deliver a relevant audience. Such is therefore a principal object of the present invention, to profit by selling such a service.

What a user is looking for can be artificially understood by a computing machine using context information. The context a user is working from or into can be engaged to tune or filter the offers an artificial intelligence machine makes to end users. The context can be gleaned from the way the users are navigating webpages. Clues are hinted their search keywords as to their particular culture, geography, age, preferences, and sensibilities. Understanding the context of the users' search keywords and items the users click on can work like constraints to display increasingly more appropriate content.

It seems as though all words are ambiguous in that they have many different meanings and even products can have many different uses and purposes. A computing machine cannot naturally resolve such ambiguities, but humans do it instantly and effortlessly. Consider the words, "apple", "attack" and movie, and the corresponding contexts each can employ.

| WORD | CONTEXTS POSSIBLE |
|---|---|
| apple | computer, hardware, software, laptop, servers, PowerBook, iMac, iBook, ClarisWorks, AppleWorks, PowerMac, Steve Jobs, acquisitions, alliances, New York Times, TheStreet.com, Adam's apple., Fruit, New York, Computer, Red, Green, Delicious, Apple Custard, Apple Sauce, Crab Apple, Apple Butter, Apple Pie, Apple chips, Apple juice, Apple cider, industry analysis, price, or volume movement |
| attack | violence, sports, heart, war, game, illness, chemical, or agent |
| movie | fun, film, cinema, cinematic, cinematograph, feature, flick, motion picture, moving picture, photoplay, screenplay, show, silent, silver screen, talkie, talking picture, videotape, theater, or entertainment |

Similarly, things, items, services, and products can have several purposes, only one of which the user will put it to. Consider the following for "patent", "kerosene", and "acetone".

| ITEM | PURPOSES POSSIBLE |
| --- | --- |
| patent | legal protection, prestige, credibility, tangible asset, bragging rights, market monopoly, scientific publjcatjon, legacy, land deed, or to mean "on its face" as an adjective |
| kerosene | engine fuel, jet fuel, lighting, heating, cleaning, dissolving, reducing, or low volatility fire |
| acetone | nail polish remover, paint cleaner, solvent, paint thinner, or as in a acetone cyanohydrin precursor to methyl methacrylate |

A method embodiment of the present invention parses each webpage or URL into its relevant words. Contextual weights are assigned to each extracted word according to how each is displayed in the electronic document. A context vector is created for each extracted word and the contexts taken from a thesaurus database. A weight vector is associated with a context vector for each relevant word. The highest weighted vectors point to the most important contexts. A check is made to see if the current interests of the user are in line with a stored profile for them. If not, a new profile is created. If so, then the users'; "likes" are reinforced. Both are then used to constrain the launching any ads to just the ones that target the current profile.

| SAMPLE WEEPAGE |
| --- |
| Breast Cancer Symptoms<br>Early breast cancer usually does not cause pain. In fact, when breast cancer first develops, there may be no symptoms at all. But as the cancer grows, it can cause changes that women should watch for:<br>A lump or thickening in or near the breast or in the underarm area.<br>A change in the size or shape of the breast.<br>A discharge from the nipple.<br>A change in the color or feel of the skin of the breast, areola, or nipple (dimpled, puckered, or scaly).<br>A woman should see her doctor if she notices any of these changes. Most often, they are not cancer, but only a doctor can tell for sure. |

The relevant words are "breast", "cancer", "doctor", and "symptoms".

RELEVANT WORDS ASSIGNED CONTEXT VECTORS AND WEIGHTED

| WORD | CONTEXT VECTOR | WEIGHT VECTOR |
| --- | --- | --- |
| breast | (mammary, glands, nipple, cancer) | (1, 1, 4, 10) |
| cancer | (disease, doctor, breast cancer) | (1, 2, 5) |
| doctor | (physician, hospital, patient, disease) | (1, 1, 1, 1) |
| symptoms | (disease, doctor, patient) | (1, 1, 1) |

So, "breast" has a vector weighted most toward "cancer". "Cancer" has a vector weighted most toward "breast cancer". And "doctor" and "symptoms" have no obvious preferred context.

Limiting marketing efforts to those that are audience appropriate will optimize the experience and the benefits for both the company making the offers and the user/buyer. Ads that are relevant to the users seeing them are more likely to generate sales.

Figure 18:
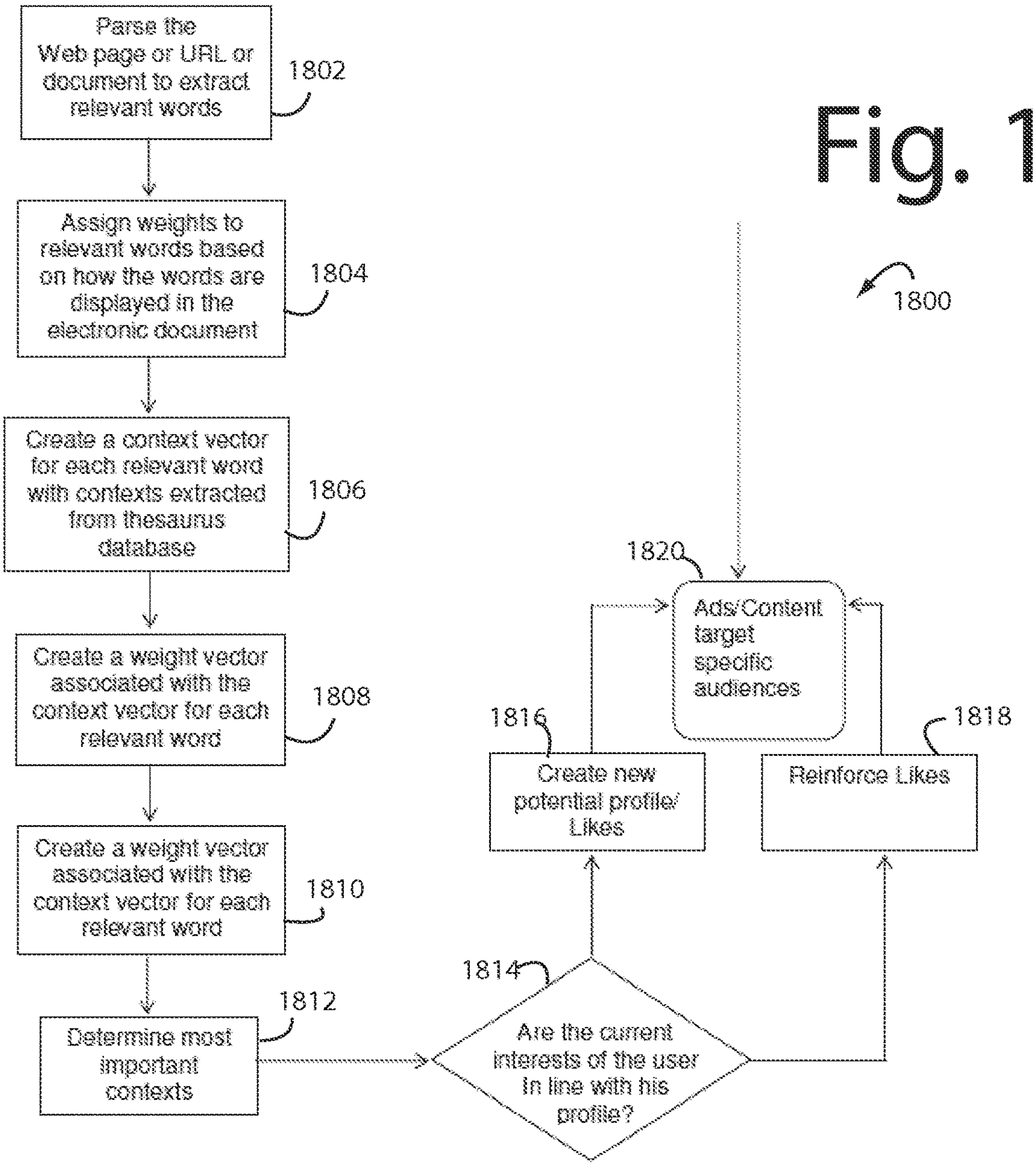
FIG. 18 is a flowchart diagram of how the word contexts in webpages can be artificially understood and worked with by a computing machine.

FIG. 18 represents a method 1800 for artificial understanding of webpage content. A step 1802 parses a Web page, URL, or document to extract its significant, relevant words. A step 1804 assigns weights to these words based on how the words are arranged in the electronic document. A step 1806 creates a context vector for each selected word with their contexts extracted from a thesaurus database. A step 1808 creates weight vectors that are associated with the corresponding context vectors for each relevant word. A step 1810 creates a weight vector associated with the context vector for each relevant word. A step 1812 determines which contexts appear to be the most important. A step 1814 asks if the current interests of the user appear to be in-line with their current profile? If not, a step 1816 creates new potential profile of "likes" and preferences. If so, a step 1818 reinforces the likes and preferences already on file. A step 1820 formulates productive ads and content designed to target specific, identified audiences.

Consumer and user behaviors can have multi-dimensional ranges that can be quantified and contributed to database 120 to identify them as individuals and to follow their travel, spending, shopping, seasonal, event related, and "likes".

Although particular embodiments of the present invention have been described and illustrated, such is not intended to limit the invention. Modifications and changes will no doubt become apparent to those skilled in the art, and it is intended that the invention only be limited by the scope of the appended claims.

The invention claimed is:

1. A computer-implemented method for examining behaviors behind payment transactions to assess and protect from financial losses caused by high-risk users, comprising:

receiving, at one or more processors, a plurality of transaction records respectively corresponding to a plurality of transacting entities;

generating, via the one or more processors, a plurality of smart agent profiles, each of the plurality of smart agent profiles— corresponding to a respective one of the plurality of transacting entities, reflecting a plurality of individual and expanded attributes of corresponding transaction record(s), being structured as one or more rolling list(s) of vectors, each rolling list of vectors corresponding to a real-time or long-term interval and being divided accordingly across different memory locations, pre-computing, via the one or more processors, a velocity count for and statistics of the plurality of individual and expanded attributes of each of the plurality of smart agent profiles;

forecasting, via the one or more processors, purchase behaviors for at least one of the plurality of transacting entities at least in part based on corresponding ones of the smart agent profiles and associated velocity counts and statistics;

receiving, at the one or more processors, a new transaction record corresponding to a first transacting entity of the plurality of transacting entities, the first transacting entity being associated with a first subset of the plurality of smart agent profiles;

generating, via the one or more processors, a computer fraud risk score for the new transaction record at least in part by— stepwise advancing the computer fraud risk score, one step-up or one step-down per attribute, over the attributes reflected in the first subset of the smart agent profiles, adjusting the computer fraud risk score to reflect lesser risk if it is determined that the first transaction record conforms to at least one of the forecasted purchase behaviors, adjusting the computer fraud risk score based on the output of a model trained on transaction records of the plurality of transaction records corresponding to at least two (2) of the plurality of transactional entities, the trained model being constructed according to one or more of: a neural network, case based reasoning, a decision tree, a genetic algorithm, fuzzy logic, and rules and constraints, automatically outputting the computer fraud risk score from one network server to another as a machine determination relating to fraud risk.

2. The computer-implemented method of claim 1, wherein the plurality of transaction records corresponds to a plurality of transactions occurring over time and involving a plurality of unrelated connections to independent merchant transaction servers.

3. The computer-implemented method of claim 2, further comprising, via the one or more processors— generating a plurality of merchant smart agent profiles, each of the plurality of merchant smart agent profiles corresponding to a respective merchant and reflecting a plurality of individual and expanded attributes associated with the respective merchant and/or with a corresponding one of the independent merchant transaction servers, wherein generating the computer fraud risk score includes adjusting the computer fraud risk score to reflect lesser risk if the new transaction record represents an abnormal deviation in behavior by comparison against a corresponding one of the plurality of merchant smart agent profiles.

4. The computer-implemented method of claim 1, further comprising, via the one or more processors, updating the first subset of the smart agent profiles based on data contained in the new transaction record.

5. The computer-implemented method of claim 1, further comprising, via the one or more processors, cleaning and enhancing data contained in the plurality of transaction records for uniformity and consistency, the data comprising heterogenous data structured according to a plurality of formats and the cleaning including standardization of the heterogenous data.

6. The computer-implemented method of claim 1, further comprising, via the one or more processors, eliminating gaps and omissions in the plurality of smart agent profiles by inspecting each of the plurality of transaction records for a match within the plurality of smart agent profiles and, if no match is found, generating a corresponding smart agent profile.

7. The computer-implemented method of claim 1, wherein generating the plurality of smart agent profiles includes data mining of historical transaction data.

8. At least one server for examining behaviors behind payment transactions to assess and protect from financial losses caused by high-risk users, comprising:

one or more processors;

non-transitory computer-readable storage media having computer-executable instructions stored thereon, wherein when executed by the one or more processors the computer-readable instructions cause the one or more processors to— receive a plurality of transaction records respectively corresponding to a plurality of transacting entities;

generate a plurality of smart agent profiles, each of the plurality of smart agent profiles— corresponding to a respective one of the plurality of transacting entities, reflecting a plurality of individual and expanded attributes of corresponding transaction record(s), being structured as one or more rolling list(s) of vectors, each rolling list of vectors corresponding to a real-time or long-term interval and being divided accordingly across different memory locations, pre-compute a velocity count for and statistics of the plurality of individual and expanded attributes of each of the plurality of smart agent profiles;

forecast purchase behaviors for at least one of the plurality of transacting entities at least in part based on corresponding ones of the smart agent profiles and associated velocity counts and statistics;

receive a new transaction record corresponding to a first transacting entity of the plurality of transacting entities, the first transacting entity being associated with a first subset of the plurality of smart agent profiles;

generate a computer fraud risk score for the new transaction record at least in part by— stepwise advancing the computer fraud risk score, one step-up or one step-down per attribute, over the attributes reflected in the first subset of the smart agent profiles, adjusting the computer fraud risk score to reflect lesser risk if it is determined that the first transaction record conforms to at least one of the forecasted purchase behaviors, adjusting the computer fraud risk score based on the output of a model trained on transaction records of the plurality of transaction records corresponding to at least two (2) of the plurality of transactional entities, the trained model being constructed according to one or more of: a neural network, case based reasoning, a decision tree, a genetic algorithm, fuzzy logic, and rules and constraints, automatically output the computer fraud risk score from one network server to another as a machine determination relating to fraud risk.

9. The at least one server of claim 8, wherein the plurality of transaction records corresponds to a plurality of transactions occurring over time and involving a plurality of unrelated connections to independent merchant transaction servers.

10. The at least one server of claim 9, wherein the computer-readable instructions, when executed by the one or more processors, further cause the one or more processors to— generate a plurality of merchant smart agent profiles, each of the plurality of merchant smart agent profiles corresponding to a respective merchant and reflecting a plurality of individual and expanded attributes associated with the respective merchant and/or with a corresponding one of the independent merchant transaction servers, wherein generating the computer fraud risk score includes adjusting the computer fraud risk score to reflect lesser risk if the new transaction record represents an abnormal deviation in behavior by comparison against a corresponding one of the plurality of merchant smart agent profiles.

11. The at least one server of claim 8, wherein the computer-readable instructions, when executed by the one or more processors, further cause the one or more processors to update the first subset of the smart agent profiles based on data contained in the new transaction record.

12. The at least one server of claim 8, wherein the computer-readable instructions, when executed by the one or more processors, further cause the one or more processors to clean and enhance data contained in the plurality of transaction records for uniformity and consistency, the data comprising heterogenous data structured according to a plurality of formats and the cleaning including standardization of the heterogenous data.

13. The at least one server of claim 8, wherein the computer-readable instructions, when executed by the one or more processors, further cause the one or more processors to eliminate gaps and omissions in the plurality of smart agent profiles by inspecting each of the plurality of transaction records for a match within the plurality of smart agent profiles and, if no match is found, generating a corresponding smart agent profile.

14. The at least one server of claim 8, wherein generating the plurality of smart agent profiles includes data mining of historical transaction data.

15. Non-transitory computer-readable storage media having computer-executable instructions for examining behaviors behind payment transactions to assess and protect from financial losses caused by high-risk users, wherein when executed by at least one processor the computer-readable instructions cause the at least one processor to:

receive a plurality of transaction records respectively corresponding to a plurality of transacting entities;

generate a plurality of smart agent profiles, each of the plurality of smart agent profiles— corresponding to a respective one of the plurality of transacting entities, reflecting a plurality of individual and expanded attributes of corresponding transaction record(s), being structured as one or more rolling list(s) of vectors, each rolling list of vectors corresponding to a real-time or long-term interval and being divided accordingly across different memory locations, pre-compute a velocity count for and statistics of the plurality of individual and expanded attributes of each of the plurality of smart agent profiles;

forecast purchase behaviors for at least one of the plurality of transacting entities at least in part based on corresponding ones of the smart agent profiles and associated velocity counts and statistics;

receive a new transaction record corresponding to a first transacting entity of the plurality of transacting entities, the first transacting entity being associated with a first subset of the plurality of smart agent profiles;

generate a computer fraud risk score for the new transaction record at least in part by— stepwise advancing the computer fraud risk score, one step-up or one step-down per attribute, over the attributes reflected in the first subset of the smart agent profiles, adjusting the computer fraud risk score to reflect lesser risk if it is determined that the first transaction record conforms to at least one of the forecasted purchase behaviors, adjusting the computer fraud risk score based on the output of a model trained on transaction records of the plurality of transaction records corresponding to at least two (2) of the plurality of transactional entities, the trained model being constructed according to one or more of: a neural network, case based reasoning, a decision tree, a genetic algorithm, fuzzy logic, and rules and constraints, automatically output the computer fraud risk score from one network server to another as a machine determination relating to fraud risk.

16. The non-transitory computer-readable storage media of claim 15, wherein the plurality of transaction records corresponds to a plurality of transactions occurring over time and involving a plurality of unrelated connections to independent merchant transaction servers.

17. The non-transitory computer-readable storage media of claim 16, wherein the computer-readable instructions, when executed by the at least one processor, further cause the at least one processor to— generate a plurality of merchant smart agent profiles, each of the plurality of merchant smart agent profiles corresponding to a respective merchant and reflecting a plurality of individual and expanded attributes associated with the respective merchant and/or with a corresponding one of the independent merchant transaction servers, wherein generating the computer fraud risk score includes adjusting the computer fraud risk score to reflect lesser risk if the new transaction record represents an abnormal deviation in behavior by comparison against a corresponding one of the plurality of merchant smart agent profiles.

18. The non-transitory computer-readable storage media of claim 15, wherein the computer-readable instructions, when executed by the at least one processor, further cause the at least one processor to update the first subset of the smart agent profiles based on data contained in the new transaction record.

19. The non-transitory computer-readable storage media of claim 15, wherein the computer-readable instructions, when executed by the at least one processor, further cause the at least one processor to clean and enhance data contained in the plurality of transaction records for uniformity and consistency, the data comprising heterogenous data structured according to a plurality of formats and the cleaning including standardization of the heterogenous data.

20. The non-transitory computer-readable storage media of claim 15, wherein the computer-readable instructions, when executed by the at least one processor, further cause the at least one processor to eliminate gaps and omissions in the plurality of smart agent profiles by inspecting each of the plurality of transaction records for a match within the plurality of smart agent profiles and, if no match is found, generating a corresponding smart agent profile.

* * * * *